United States Patent
Nam et al.

(10) Patent No.: US 12,127,018 B2
(45) Date of Patent: Oct. 22, 2024

(54) UNIFIED MEASUREMENT CONFIGURATIONS FOR CROSS-LINK INTERFERENCE, SELF-INTERFERENCE, AND WIRELESS SENSING

(71) Applicant: QUALCOMM Incorporated, San Diego, CA (US)

(72) Inventors: Wooseok Nam, San Diego, CA (US); Yucheng Dai, San Diego, CA (US); Juan Montojo, San Diego, CA (US); Tao Luo, San Diego, CA (US); Peter Gaal, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/301,175

(22) Filed: Mar. 29, 2021

(65) Prior Publication Data
US 2022/0312232 A1     Sep. 29, 2022

(51) Int. Cl.
*H04L 12/00*     (2006.01)
*H04W 24/08*     (2009.01)
*H04W 24/10*     (2009.01)

(52) U.S. Cl.
CPC .......... *H04W 24/08* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2020/0313779 A1* | 10/2020 | Kim | H04B 1/525 |
| 2021/0006438 A1* | 1/2021 | Harrebek | H04W 24/10 |
| 2021/0006997 A1* | 1/2021 | Jin | H04L 27/2602 |
| 2021/0392530 A1* | 12/2021 | Shi | H04W 24/08 |
| 2022/0006501 A1* | 1/2022 | Kim | H04B 7/0632 |
| 2022/0140959 A1* | 5/2022 | Pedersen | H04L 5/0053 370/329 |
| 2022/0159580 A1* | 5/2022 | Su | H04W 72/0446 |
| 2022/0256519 A1* | 8/2022 | Jeon | G01S 7/42 |
| 2023/0189382 A1* | 6/2023 | Haustein | H04W 76/20 370/329 |

* cited by examiner

*Primary Examiner* — Noel R Beharry
*Assistant Examiner* — Lionel Preval
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may receive a measurement configuration that is associated with a common measurement object or a common resource pool for at least two of cross-link interference (CLI) measurements, self-interference (SI) measurements, or wireless sensing measurements. The UE may perform, based at least in part on the measurement configuration, one or more measurements that include at least one of a CLI measurement, an SI measurement, or a wireless sensing measurement. The UE may transmit, based at least in part on the measurement configuration, a measurement report indicating at least one measurement of the one or more measurements. Numerous other aspects are described.

30 Claims, 13 Drawing Sheets

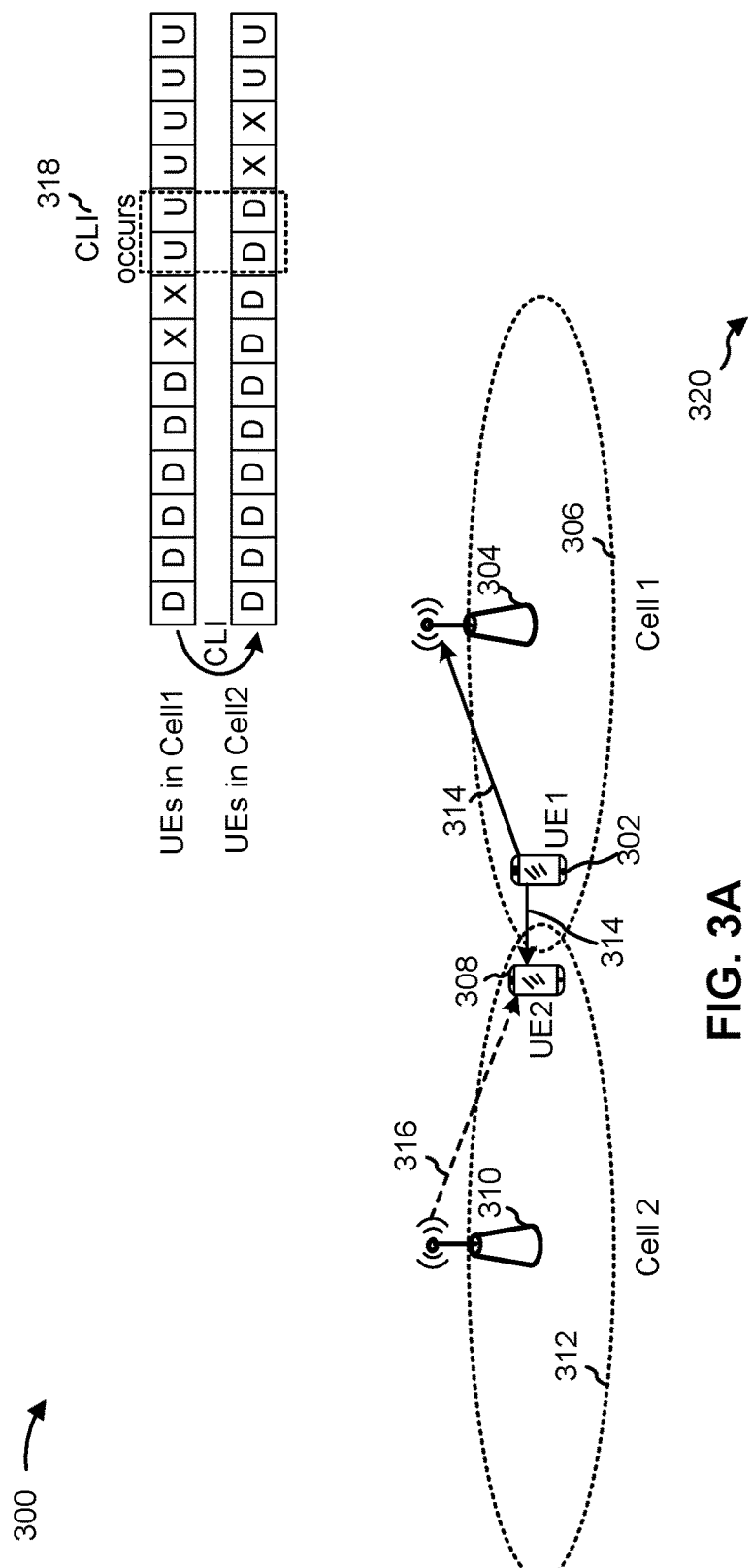
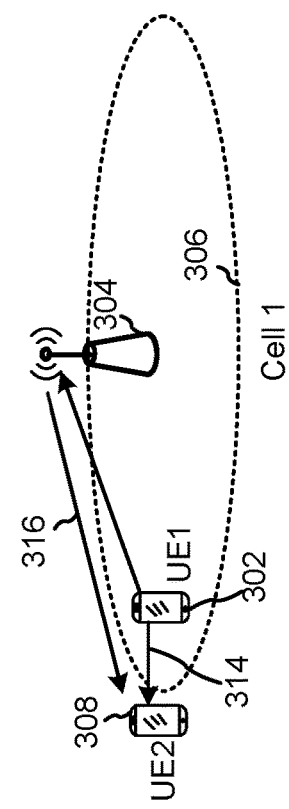
FIG. 3A
FIG. 3B

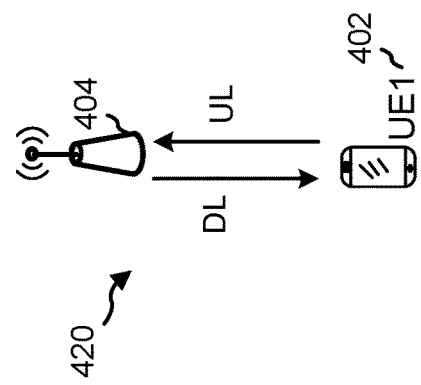
FIG. 4B
FIG. 4C
FIG. 4A

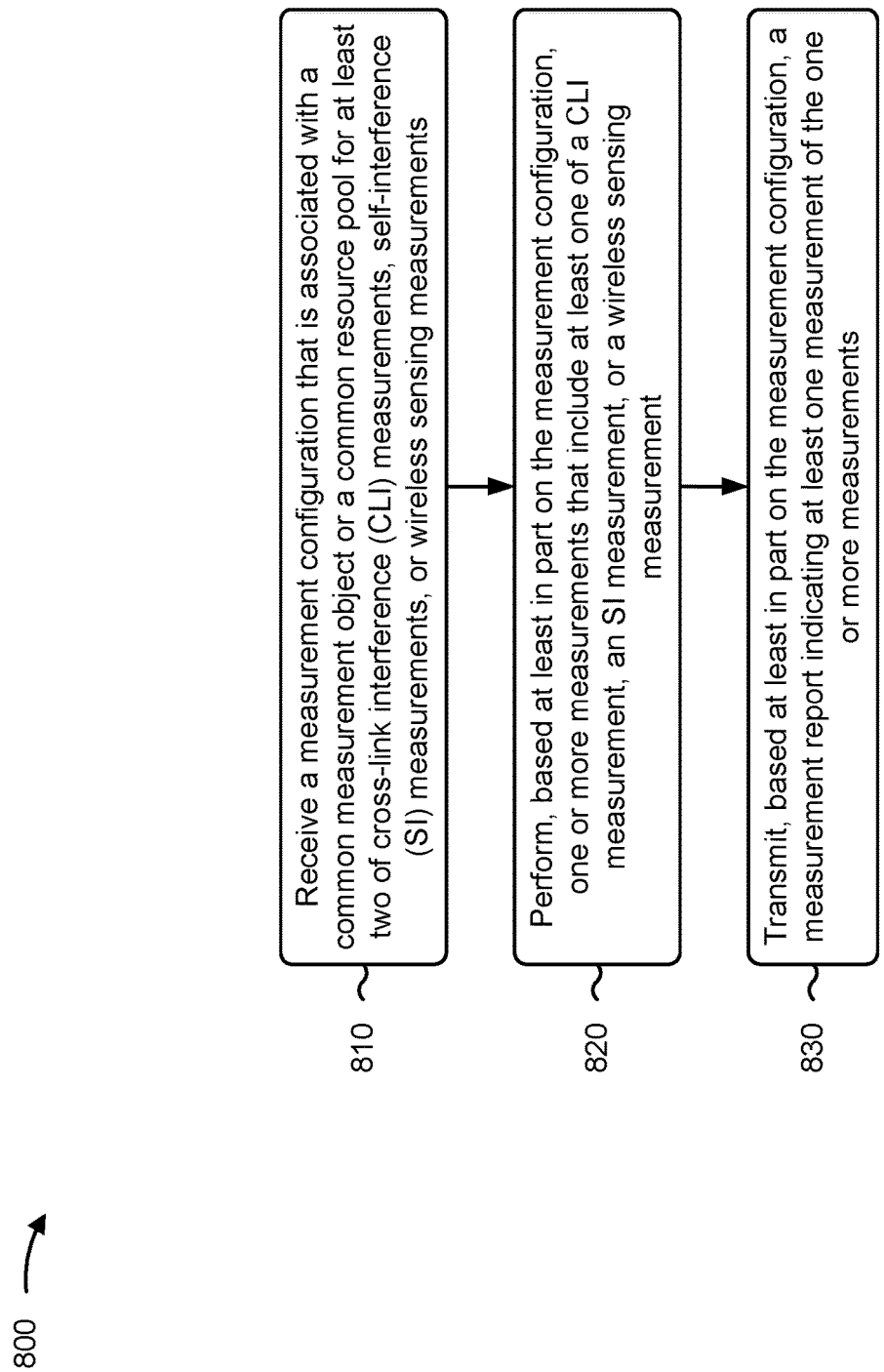

UNIFIED MEASUREMENT CONFIGURATIONS FOR CROSS-LINK INTERFERENCE, SELF-INTERFERENCE, AND WIRELESS SENSING

FIELD OF THE DISCLOSURE

Aspects of the present disclosure generally relate to wireless communication and to techniques and apparatuses for unified measurement configurations for cross-link interference, self-interference, and wireless sensing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a measurement configuration that is associated with a common measurement object or a common resource pool for at least two of cross-link interference (CLI) measurements, self-interference (SI) measurements, or wireless sensing measurements; performing, based at least in part on the measurement configuration, one or more measurements that include at least one of a CLI measurement, an SI measurement, or a wireless sensing measurement; and transmitting, based at least in part on the measurement configuration, a measurement report indicating at least one measurement of the one or more measurements.

In some aspects, a method of wireless communication performed by a base station includes determining a measurement configuration that is associated with a common measurement object or a common resource pool for at least two of CLI measurements, SI measurements, or wireless sensing measurements; transmitting, to a UE, the measurement configuration; and receiving, from the UE, a measurement report that indicates at least one of a CLI measurement, an SI measurement, or a wireless sensing measurement.

In some aspects, a UE for wireless communication includes a memory and one or more processors, coupled to the memory, configured to: receive a measurement configuration that is associated with a common measurement object or a common resource pool for at least two of CLI measurements, SI measurements, or wireless sensing measurements; perform, based at least in part on the measurement configuration, one or more measurements that include at least one of a CLI measurement, an SI measurement, or a wireless sensing measurement; and transmit, based at least in part on the measurement configuration, a measurement report indicating at least one measurement of the one or more measurements.

In some aspects, a base station for wireless communication includes a memory and one or more processors, coupled to the memory, configured to: determine a measurement configuration that is associated with a common measurement object or a common resource pool for at least two of CLI measurements, SI measurements, or wireless sensing measurements; transmit, to a UE, the measurement configuration; and receive, from the UE, a measurement report that indicates at least one of a CLI measurement, an SI measurement, or a wireless sensing measurement.

In some aspects, a non-transitory computer-readable medium storing a set of instructions for wireless communication includes one or more instructions that, when executed by one or more processors of a UE, cause the UE to: receive a measurement configuration that is associated with a common measurement object or a common resource pool for at least two of CLI measurements, SI measurements, or wireless sensing measurements; perform, based at least in part on the measurement configuration, one or more measurements that include at least one of a CLI measurement, an SI measurement, or a wireless sensing measurement; and transmit, based at least in part on the measurement configuration, a measurement report indicating at least one measurement of the one or more measurements.

In some aspects, a non-transitory computer-readable medium storing a set of instructions for wireless communication includes one or more instructions that, when executed by one or more processors of a base station, cause the base station to: determine a measurement configuration that is associated with a common measurement object or a common resource pool for at least two of CLI measurements, SI measurements, or wireless sensing measurements; transmit, to a UE, the measurement configuration; and receive, from the UE, a measurement report that indicates at least one of a CLI measurement, an SI measurement, or a wireless sensing measurement.

In some aspects, an apparatus for wireless communication includes means for receiving a measurement configuration that is associated with a common measurement object or a common resource pool for at least two of CLI measurements, SI measurements, or wireless sensing measurements; means for performing, based at least in part on the measurement configuration, one or more measurements that include at least one of a CLI measurement, an SI measurement, or a wireless sensing measurement; and means for transmitting, based at least in part on the measurement configuration, a measurement report indicating at least one measurement of the one or more measurements.

In some aspects, an apparatus for wireless communication includes means for determining a measurement configuration that is associated with a common measurement object or a common resource pool for at least two of CLI measurements, SI measurements, or wireless sensing measurements; means for transmitting, to a UE, the measurement configuration; and means for receiving, from the UE, a measurement report that indicates at least one of a CLI measurement, an SI measurement, or a wireless sensing measurement.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3A is a diagram illustrating a wireless network operating in a semi-static time division duplex (TDD) configuration, in accordance with the present disclosure.

FIG. 3B is a diagram illustrating a wireless network operating in dynamic TDD configuration, in accordance with the present disclosure.

FIGS. 4A-4C are diagrams illustrating examples of full duplex (FD) communication, in accordance with the present disclosure.

FIGS. 8 and 9 are diagrams illustrating example processes associated with unified measurement configurations for CLI, SI, and wireless sensing, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
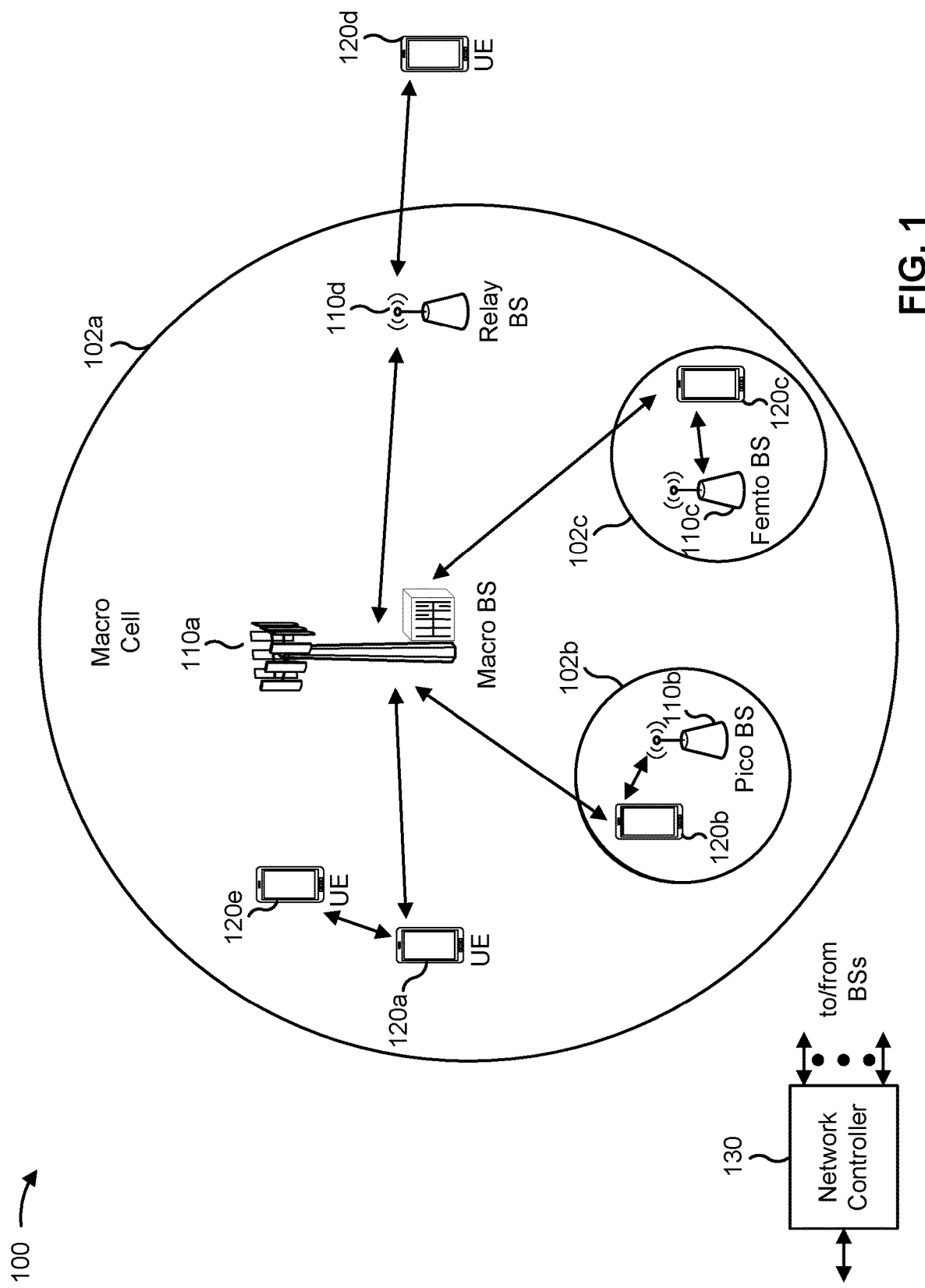
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or a Long-term Evolution (LTE) network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
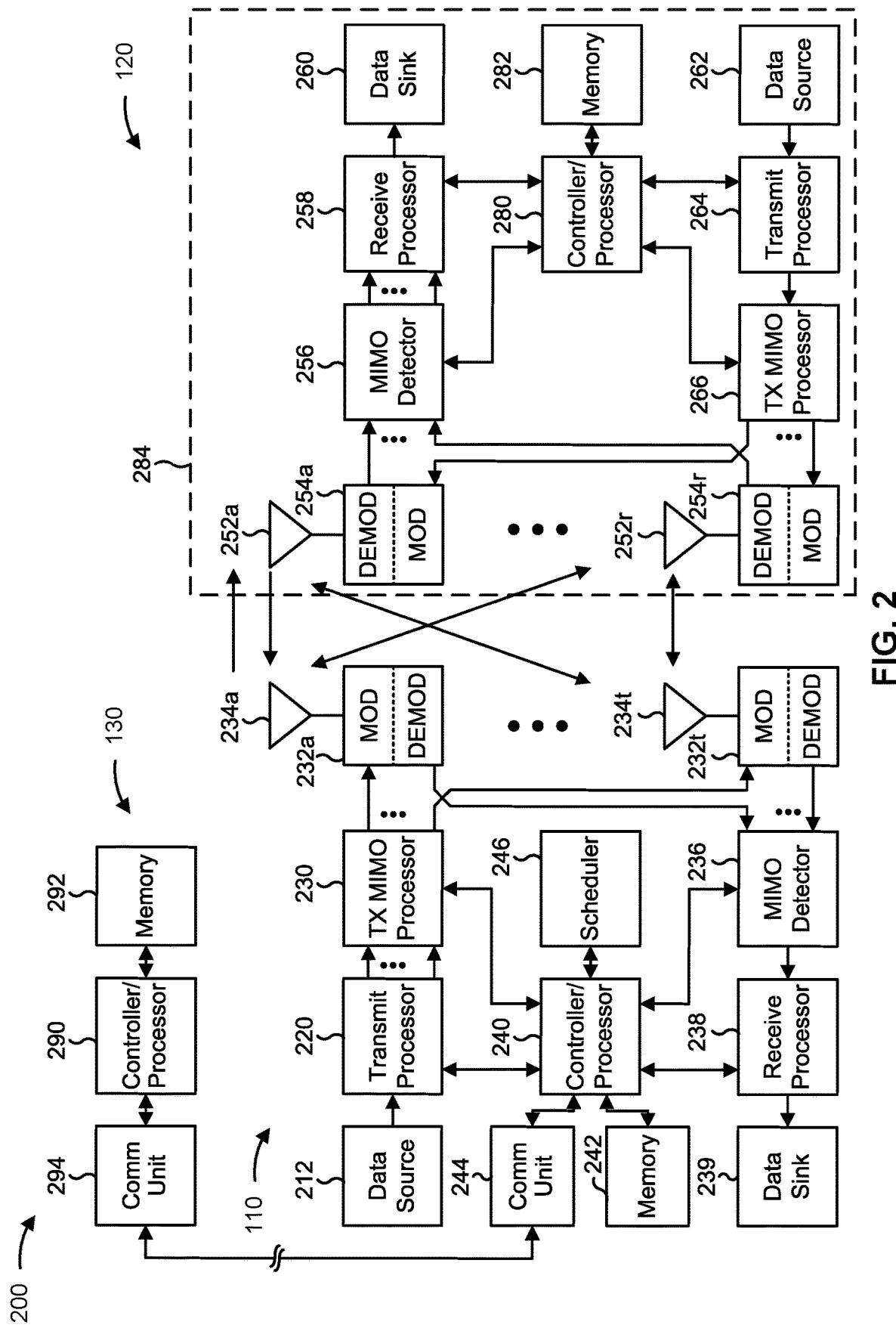
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7A, 7B, 8, and 9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7A, 7B, 8, and 9.

Controller/processor 240 of base station 110, controller/processor 280 of UE 120, and/or any other component(s) of FIG. 2 may perform one or more techniques associated with unified measurement configurations for cross-link interference, self-interference, and wireless sensing, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE 120 includes means for receiving a measurement configuration that is associated with a common measurement object or a common resource pool for at least two of cross-link interference (CLI) measurements, self-interference (SI) measurements, or wireless sensing measurements; means for performing, based at least in part on the measurement configuration, one or more measurements that include at least one of a CLI measurement, an SI measurement, or a wireless sensing measurement; and/or means for transmitting, based at least in part on the measurement configuration, a measurement report indicating at least one measurement of the one or more measurements. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving the measurement configuration indicating a measurement object and a parameter indicating a usage associated with measurement resources associated with the measurement object.

In some aspects, the UE 120 includes means for receiving the measurement configuration indicating at least one of a first measurement object associated with CLI measurements, a second measurement object associated with SI measurements, or a third measurement object associated with wireless sensing measurements.

In some aspects, the UE 120 includes means for receiving the measurement configuration indicating that the common resource pool is shared between at least two of the first measurement object, the second measurement object, or the third measurement object.

In some aspects, the UE 120 includes means for transmitting a capability report indicating one or more capabilities associated with the UE, wherein the measurement configuration is based at least in part on the one or more capabilities.

In some aspects, the UE 120 includes means for transmitting the measurement report indicating at least one of: a measurement object index associated with the at least one measurement, a reference signal index associated with the at least one measurement, a time of arrival associated with the at least one measurement, or a measurement value associated with the at least one measurement.

In some aspects, the UE 120 includes means for transmitting the measurement report based at least in part on a reporting configuration associated with the measurement configuration, wherein the reporting configuration indicates that the measurement report is at least one of: a periodic measurement report, a semi-persistent measurement report, an aperiodic measurement report, or a trigger event based measurement report.

In some aspects, the UE 120 includes means for receiving a reporting configuration that indicates one or more trigger events associated with reporting measurements, wherein the one or more trigger events include at least one of: a measurement value satisfying a first threshold, a time of arrival variation satisfying a second threshold, a measurement value variation satisfying a third threshold, or an object detection event associated with a wireless sensing measurement.

In some aspects, the base station 110 includes means for determining a measurement configuration that is associated with a common measurement object or a common resource pool for at least two of CLI measurements, SI measurements, or wireless sensing measurements; means for transmitting, to a UE, the measurement configuration; and/or means for receiving, from the UE, a measurement report that indicates at least one of a CLI measurement, an SI measurement, or a wireless sensing measurement. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for transmitting the measurement configuration indicating a measurement object and a parameter indicating a usage associated with measurement resources associated with the measurement object.

In some aspects, the base station 110 includes means for transmitting the measurement configuration indicating at least one of a first measurement object associated with CLI measurements, a second measurement object associated with SI measurements, or a third measurement object associated with wireless sensing measurements.

In some aspects, the base station 110 includes means for transmitting the measurement configuration indicating that the common resource pool is shared between at least two of the first measurement object, the second measurement object, or the third measurement object.

In some aspects, the base station 110 includes means for receiving, from the UE, a capability report indicating one or more capabilities associated with the UE, wherein determining the measurement configuration is based at least in part on the one or more capabilities.

In some aspects, the base station 110 includes means for receiving the measurement report indicating at least one of: a measurement object index, a reference signal index, a time of arrival associated with one or more measurements, or a measurement value associated with the one or more measurements.

In some aspects, the base station 110 includes means for receiving the measurement report based at least in part on a reporting configuration associated with the measurement configuration, wherein the reporting configuration indicates that the measurement report is at least one of: a periodic measurement report, a semi-persistent measurement report, an aperiodic measurement report, or a trigger event based measurement report.

In some aspects, the base station 110 includes means for transmitting a reporting configuration that indicates one or more trigger events associated with reporting measurements, wherein the one or more trigger events include at least one of: a measurement value satisfying a first threshold, a time of arrival variation satisfying a second threshold, a measurement value variation satisfying a third threshold, or an object detection event associated with a wireless sensing measurement.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3A is a diagram illustrating a wireless network 300 operating in a semi-static time division duplex (TDD) configuration, in accordance with the present disclosure. FIG. 3B is a diagram illustrating a wireless network 320 operating in dynamic TDD configuration, in accordance with the present disclosure. Dynamic TDD may enhance spectrum efficiency of wireless communication networks and provide a higher throughput by dynamically altering uplink (UL) or downlink (DL) transmission direction. However, if nearby UEs have different TDD UL-DL slot formats, one UE (e.g., the second UE 308) may be a victim and may receive an UL transmission from another UE (e.g., the first UE 302) known as an aggressor. The received UL transmission from the first UE 302 is known as cross link interference (CLI). CLI occurs when a UL symbol (e.g., an interfering symbol) of an aggressor collides with a DL symbol (e.g., an interfered symbol) of a victim. CLI may be caused by a UL transmission from the aggressor UE (e.g., the first UE 302). The configuration of dynamic TDD is able to change dynamically in response to a change of traffic pattern. For example, in instances where the traffic pattern is UL heavy, dynamic TDD may recognize the change in the traffic pattern and adapt by providing more UL symbols to meet the demand. Alternatively, in instances where the traffic pattern is DL heavy, dynamic TDD may provide more DL symbols to meet the demand.

In FIG. 3A, the first UE 302 is within Cell 1 306 and is being served by base station 304, while the second UE 308 is within Cell 2 312 and is being served by base station 310. CLI may occur between UEs at the cell edges of nearby cells, as UEs at cell edges of nearby cells may be in close proximity to each other. As shown in FIG. 3A, the first UE 302 and the second UE 308 are at their respective cell edges, and may be communicating with their respective base stations. The first UE 302 may transmit a UL transmission 314 to base station 304, while the second UE 308 is receiving a DL transmission 316 from base station 310. However, in certain instances, the UL transmission 314 sent by the first UE 302 to base station 304 may also be received by the second UE 308 while receiving the DL transmission 316 from base station 310. The UL transmission 314 from the first UE 302 received by the second UE 308 causes UL transmission 314 and may interfere with the DL transmission 316 the second UE 308 from base station 310. As such, one or more UL symbols of the UL transmission 314 may collide with one or more DL symbols of the DL transmission 316. In the example of FIG. 3A, two UL symbols of the UL transmission 314 overlap or collide with two DL symbols of the DL transmission 316, such that CLI occurs at the overlap 318.

In the example of FIG. 3B, both the first UE 302 and the second UE 308 are being served by the same cell (e.g., cell 1 306). Both the first UE 302 and the second UE 308 are near the cell edge, and in some instances, the UL transmission 314 sent by the first UE 302 to base station 304 may also be received by the second UE 308 while receiving the DL transmission 316 from base station 304. The UL transmission 314 from the first UE 302 received by the second UE may cause UL transmission 314 and may interfere with the DL 316 of the second UE 308 from the base station 304. As a result, one or more UL symbols of the UL transmission 314 may collide with one or more DL symbols of the DL transmission 316.

CLI measurements metrics include sounding reference signals reference signal received power (SRS-RSRP) and CLI-received signal strength indicator (CLI-RSSI). SRS-RSRP may include the linear average of the power contributions of the sounding reference signal (SRS) to be measured over the configured resource elements within the considered measurement frequency bandwidth in the time resources in the configured measurement occasions. CLI-RSSI may include the linear average of the total received power observed only in certain OFDM symbols of measurement time resource(s), in the measurement bandwidth, over the configured resource elements for measurement by the UE. For both SRS-RSRP and CLI-RSSI measurement reports, both events may be triggered, and periodic reporting is supported. Layer 3 (L3) filtering may be applied, such that for CLI-RSSI measurements, the implementation of the UE may determine whether to reset filtering upon a bandwidth part (BWP) switch. A dedicated measurement gap may not be needed.

Figure 3C:
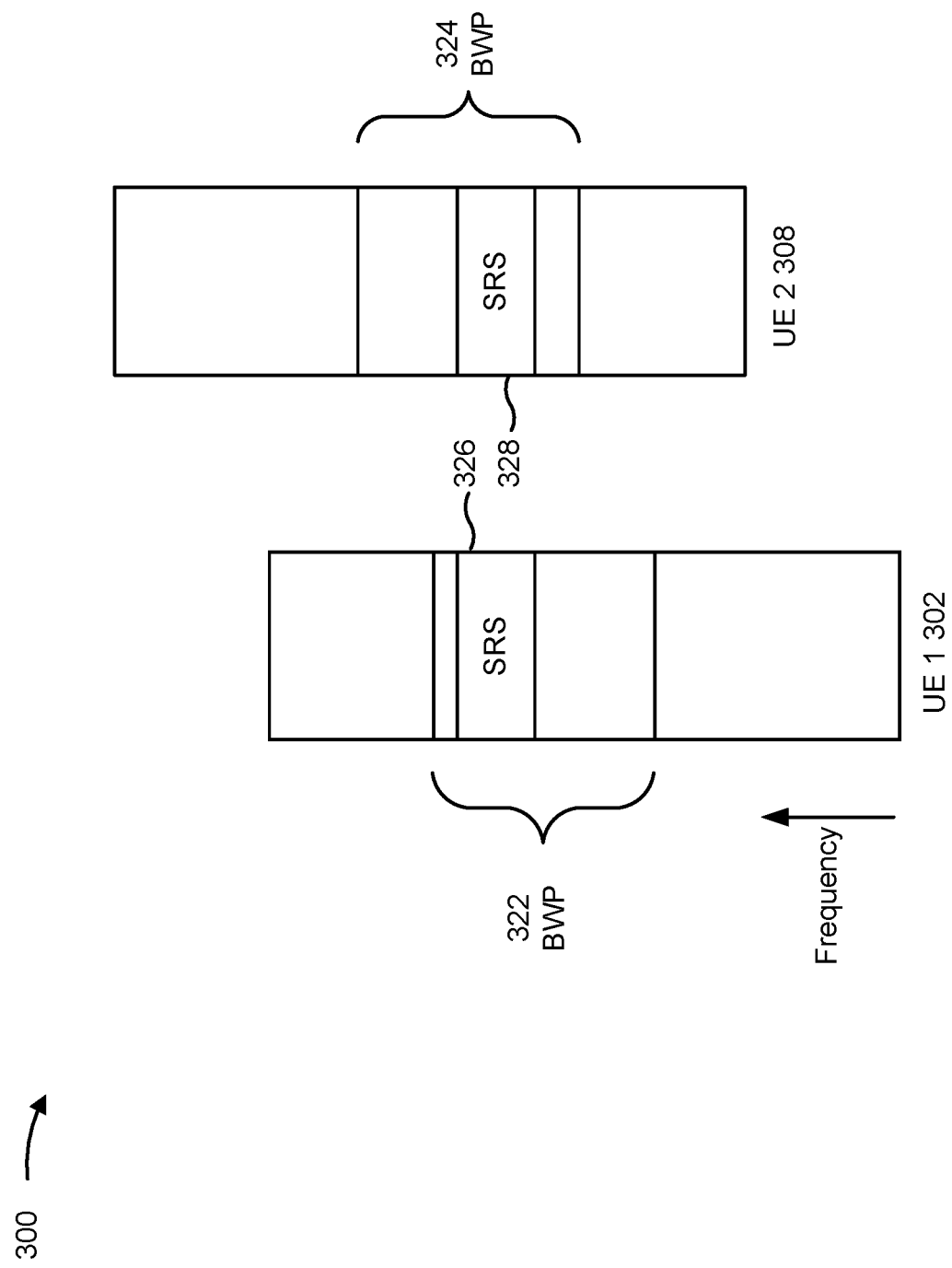
FIG. 3C is a diagram illustrating a measurement resource configuration associated with performing cross-link interference (CLI) measurements, in accordance with the present disclosure.

FIG. 3C is a diagram illustrating a measurement resource configuration associated with performing CLI measurements, in accordance with the present disclosure. For example, as shown in FIG. 3C, the first UE 302 and the second UE 308 may be configured with a measurement resource, shown as a sounding reference signal (SRS) resource. A base station may configure a UE (e.g., the first UE 302 and/or the second UE 308) with one or more SRS resource sets to allocate resources for SRS transmissions by the UE. For example, a configuration for SRS resource sets may be indicated in a radio resource control (RRC) message (e.g., an RRC configuration message or an RRC reconfiguration message). An SRS resource set may include one or more resources, which may include time resources and/or frequency resources (e.g., a slot, a symbol, a resource block, and/or a periodicity for the time resources). In some aspects, the configuration for an SRS resource set may indicate a use case (e.g., in an SRS-SetUse information element) for the SRS resource set. For example, an SRS resource set may have a use case of antenna switching, codebook, non-codebook, and/or beam management, among other examples.

As shown in FIG. 3C, the first UE 302 (e.g., the aggressor UE) may be associated with an active BWP 322. Similarly, the second UE 308 (e.g., the victim UE) may be associated with an active BWP 324. The first UE 302 (e.g., the aggressor UE) may be configured with an SRS resource 326 associated with performing CLI measurements. For example, the first UE 302 may be configured to transmit an SRS using the SRS resource 326. The second UE 308 may be configured with an SRS resource 328 associated with performing CLI measurements. For example, the second UE 308 may be configured to measure SRSs received using the SRS resource 328. In some aspects, the SRS resource 326 and the SRS resource 328 may be equivalent in that the SRS resource 326 and the SRS resource 328 may have a same frequency resources and/or time resources, such that an SRS transmitted by the first UE 302 can be received by the second UE 308 using the SRS resource 328. However, the configuration for the SRS resource 326 and the configuration for the SRS resource 328 may be different as the bandwidth and/or the active BWP for the first UE 302 and the second UE 308 may be different (e.g., not aligned in the frequency domain). In some cases, the serving base station of the first UE 302 (e.g., base station 304) and the serving base station of the second UE 308 (e.g., base station 310) may communicate to align the SRS resource 326 and the SRS resource 328 to enable the second UE 308 to measure CLI by measuring SRSs transmitted by the first UE 302.

As indicated above, FIGS. 3A-3C are provided as one or more examples. Other examples may differ from what is described with regard to FIGS. 3A-3C.

FIGS. 4A-4C are diagrams illustrating examples 400, 410, 420 of full duplex (FD) communication, in accordance with the present disclosure. The example 400 of FIG. 4A includes a first UE 402 (e.g., UE 1) and two base stations (e.g., TRPs) 404-1, 404-2, wherein the first UE 402 is sending UL transmissions to base station 404-1 and is receiving DL transmissions from base station 404-2. In the example 400 of FIG. 4A, FD is enabled for the first UE 402, but not for the base stations 404-1, 404-2. The example 410 of FIG. 4B includes two UEs, a first UE 402-1 (e.g., UE 1) and a second UE 402-2 (e.g., UE 2), and a base station 404, wherein the first UE 402-1 is receiving a DL transmission from the base station 404 and the second UE 402-2 is transmitting a UL transmission to the base station 404. In the example 410 of FIG. 4B, FD is enabled for the base station 404, but not for the UEs (e.g., the first UE 402-1 and second UE 402-2). The example 420 of FIG. 4C includes a first UE 402 (e.g., UE 1) and a base station 404, wherein the first UE 402 is receiving a DL transmission from the base station 404 and the first UE 402 is transmitting a UL transmission to the base station 404. In the example 420 of FIG. 4C, FD is enabled for both the first UE 402 and the base station 404.

As indicated above, FIGS. 4A-4C are provided as one or more examples. Other examples may differ from what is described with regard to FIGS. 4A-4C.

Figure 5:
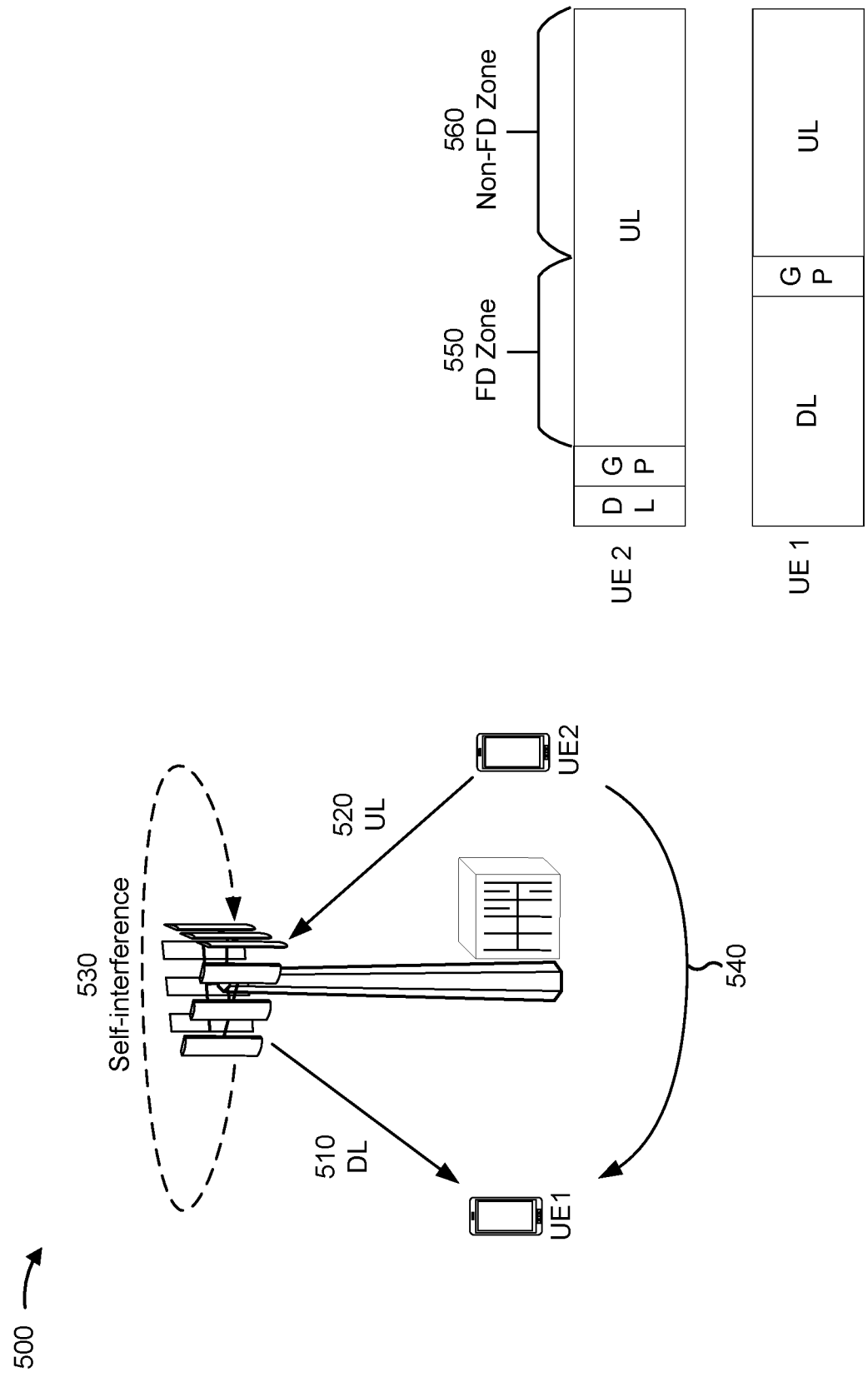
FIG. 5 is a diagram illustrating an example of a zone, a non-FD zone, and self-interference (SI) associated with FD communications, in accordance with the present disclosure.

FIG. 5 is a diagram illustrating an example 500 of a FD zone, a non-FD zone, and self-interference associated with FD communications, in accordance with the present disclosure. As shown, example 500 includes a base station (e.g., base station 110), a first UE (e.g., UE 120), and a second UE (e.g., another UE 120). In some aspects, the base station may be capable of FD communication. FD communication may include a contemporaneous uplink and downlink communication using the same resources. For example, the base station may perform a DL transmission to the first UE (shown by reference number 510) and may receive an UL transmission from the second UE (shown by reference number 520) using the same frequency resources and at least partially overlapping in time.

As shown by reference number 530, the DL transmission from the base station may self-interfere with the UL transmission to the base station. This may be caused by a variety of factors, such as the higher transmit power for the DL transmission (as compared to the UL transmission) and/or radio frequency bleeding. Furthermore, as shown by reference number 540, the UL transmission to the base station from the second UE may interfere with the DL transmission from the base station to the first UE, thereby diminishing DL performance of the first UE. In some aspects, such as where a UE (e.g., the first UE and/or the second UE) is capable of FD communication, an uplink transmission from the UE may self-interfere with a downlink transmission to the UE, in a similar manner as described above.

An FD zone is shown by reference number 550 and a non-FD zone is shown by reference number 560. "FD zone" may refer to a time period and/or a frequency region in which a wireless communication device (e.g., a base station 110, a UE 120, a node, or a similar device) performs FD communication, and "non-FD zone" may refer to a time period and/or a frequency region in which a wireless communication device performs non-FD communication. The FD zone may be associated with higher self-interference, and therefore a lower signal-to-interference-plus-noise ratio (SINR), than the non-FD zone.

As indicated above, FIG. 5 is provided as an example. Other examples may differ from what is described with respect to FIG. 5.

Figure 6:
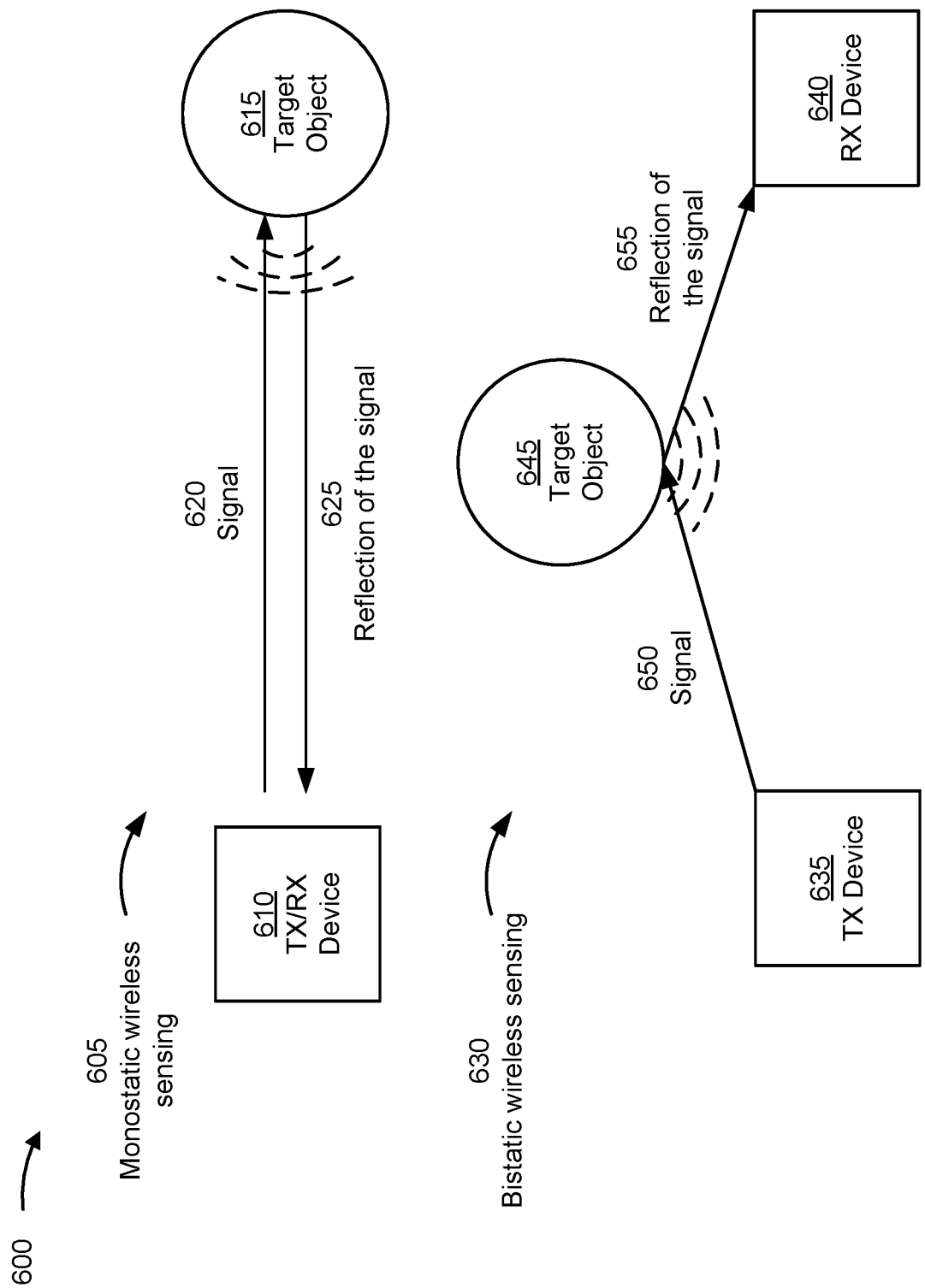
FIG. 6 is a diagram illustrating an example of wireless sensing, in accordance with the present disclosure.

FIG. 6 is a diagram illustrating an example 600 of wireless sensing, in accordance with the present disclosure. Wireless communication signals (e.g., RF signals configured to carry OFDM symbols) transmitted between a UE and a base station can be reused for wireless sensing (e.g., environment sensing). Using wireless communication signals for wireless sensing can be regarded as consumer-level radar with advanced detection capabilities that enable, among other things, touchless/device-free interaction with a device/system. "Wireless sensing" may be a radar operation performed by a wireless communication device, such as a UE and/or a base station, using wireless communication signals. Wireless sensing may also be referred to as environment sensing, radar sensing, and/or RF sensing, among other examples. The wireless communication signals may be cellular communication signals (e.g., LTE signals or NR signals) and/or wireless local access network (WLAN) signals, among other examples. As a particular example, the wireless communication signals may be an OFDM waveform as utilized in LTE and NR. High-frequency communication signals, such as millimeter wave signals, may be beneficial to use as wireless sensing signals because the higher frequency provides a more accurate range (e.g., distance) detection.

As shown in FIG. 6, a wireless communication device may detect and/or monitor a target object by transmitting and/or measuring wireless communication signals. Possible use cases of wireless sensing include health monitoring (such as heartbeat detection, and/or respiration rate monitoring, among other examples), gesture recognition (such as human activity recognition, keystroke detection, and/or sign language recognition, among other examples), contextual information acquisition (such as location detection/tracking, direction finding, and/or range estimation, among other examples), and/or automotive radar (such as smart cruise control and/or collision avoidance), among other examples.

Similar to conventional radar (e.g., frequency modulation continuous waveform (FMCW) radar), an OFDM-based radar signal can be used to estimate the range (e.g., distance), velocity (e.g., Doppler spread), and/or angle (e.g., angle of arrival (AoA)) of a target object. In FMCW techniques, an RF signal with a known stable frequency continuous wave (i.e., an RF signal with constant amplitude and frequency) varies up and down in frequency over a fixed period of time according to a modulating signal. Signals may be transmitted in a beam (e.g., using beamforming) and may reflect off nearby objects within the beam. A portion of the transmitted RF signals is reflected back towards a radar sensor, which receives/detects the RF return data (e.g., the reflections of the transmitted signals).

FMCW radar signals are typically formed as a simple chirp waveform. A chirp waveform can be used when the only purpose of the transmitted RF signal is for wireless sensing. However, due to the short wavelength, a more complex OFDM waveform can be used for both wireless communication (e.g., over a wireless network) and wireless sensing. To use an OFDM waveform as a signal for wireless sensing, specific reference signals, referred to herein as radar reference signals (RRS), may be needed. The wireless sensing performance (e.g., resolution and maximum values of range, velocity, and/or angle) may depend on the RRS design. For example, for a gesture recognition use case, coarse range/velocity estimation may be sufficient for the wireless sensing. That is, it may be sufficient for a wireless communication device to be able to detect a pattern of movement relative to the current position of the target object (e.g., a user's hand or head). In this case, a low density (e.g., sparse) RRS with a short wavelength and narrow bandwidth may be sufficient to provide the necessary range and velocity resolution. For a vibration detection use case, such as for respiration monitoring, accurate Doppler estimation may be important, whereas accurate range estimation may not be as important. In this case, a high-density RRS with a long duration in the time domain may be beneficial. For a location detection use case, such as for object detection, accurate range estimation may be important, whereas accurate Doppler estimation may not be as important. In this case, a high-density wideband RRS in the frequency domain may be beneficial. Therefore, a base station may configure one or more RRSs depending on a use case of the wireless sensing to improve the wireless sensing performance. In some cases, an RRS may be an SRS.

As shown by reference number 605, a wireless communication device may perform monostatic wireless sensing (e.g., monostatic radar sensing) using an air interface (e.g., an NR-air interface) and wireless signals, such as an RRS and/or an SRS. For example, as shown by reference number 610 may perform target object detection to detect a target object 615. As shown by reference number 620, the Tx/Rx device 610 may transmit a signal (e.g., an RRS and/or an SRS) associated with a wireless sensing operation. The signal may reflect or deflect off of the target object 615, such that at least a portion of the signal reflects back towards the Tx/Rx device 610. For example, as shown by reference number 625, a reflection of the signal (e.g., that was transmitted by the Tx/Rx device 610) may be received by the Tx/Rx device 610. The Tx/Rx device 610 may measure the reflection of the signal to determine a range (e.g., distance), a velocity (e.g., Doppler spread), and/or an angle (e.g., an AoA) of the target object 615. As a result, the Tx/Rx device 610 may be enabled to perform target object detection using the monostatic wireless sensing (e.g., monostatic radar sensing) technique.

As shown by reference number 630, a Tx device 635 and an Rx device 640 may coordinate with one another to perform bistatic wireless sensing (e.g., bistatic radar sensing) using an air interface (e.g., an NR-air interface) and wireless signals, such as an RRS and/or an SRS. For example, as shown by reference number 650, the Tx device 635 may transmit a signal (e.g., an RRS and/or an SRS) associated with a wireless sensing operation. The signal may reflect or deflect off of a target object 645, such that at least a portion of the signal reflects back towards the Rx device 640. For example, as shown by reference number 655, a reflection of the signal (e.g., that was transmitted by the Tx device 635) may be received by the Rx device 640. The Rx device 640 may measure the reflection of the signal to determine a range (e.g., distance), a velocity (e.g., Doppler spread), and/or an angle (e.g., an AoA) of the target object 645. As a result, the Tx device 635 and the Rx device 640 may be enabled to perform target object detection using the bistatic wireless sensing (e.g., bistatic radar sensing) technique.

As indicated above, FIG. 6 is provided as an example. Other examples may differ from what is described with respect to FIG. 6.

In some cases, a wireless communication device (e.g., a UE and/or a base station) may be configured to perform multiple different types of measurements. For example, the wireless communication device may be configured to perform CLI measurements, self-interference (SI) measurements, and/or wireless sensing measurements, among other examples. In some cases, a wireless communication device capable of full duplex communication may be configured to perform SI measurements and/or monostatic wireless sensing measurements, among other examples. In some cases, a wireless communication device capable of half duplex communication (e.g., is not capable of full duplex communication) may be configured to perform CLI measurements and/or bistatic wireless sensing measurements, among other examples. As a result, new measurement resources and/or reference signals to be used to perform the different types of measurements need to be defined and/or configured. However, configuring measurement resources and/or reference signals for multiple different types of measurements adds a significant signaling overhead (e.g., associated with transmitting and/or receiving measurement configurations for each type of measurement). Additionally, configuring measurement resources and/or reference signals for multiple different types of measurements adds additional complexity associated with performing the different types of measurements because the wireless communication device may be required to coordinate between multiple measurement configurations to perform the different types of measurements.

In some cases, CLI measurements, SI measurements, and/or wireless sensing measurements may have one or more similarities. For example, SI measurements may be a type of CLI measurements where the aggressor UE and the victim UE are the same UE (e.g., operating in a full duplex mode). As another example, monostatic wireless sensing measurements may be a type of SI measurement where the measurement is of an indirect path or a non-dominant path (e.g., one or more non-first arrival paths). As used herein, "indirect path" or "non-dominant path" may refer to a signal that is not a first arriving signal at the wireless communication device during a measurement period and/or is not associated with a highest measurement value during the measurement period. "Dominant path" or "direct path" may refer to a signal that is a first arriving signal at the wireless communication device during a measurement period and/or is associated with a highest measurement value during the measurement period. As another example, bistatic wireless sensing measurements may be a type of CLI measurements where the measurement is of one or more indirect paths. Therefore, it may be beneficial to coordinate measurement configurations between CLI measurements, SI measurements, and/or wireless sensing measurements.

Some techniques and apparatuses described herein enable unified measurement configurations for CLI, SI, and wireless sensing. For example, a base station may configure a UE with a measurement configuration. In some aspects, the measurement configuration may indicate a common measurement object (e.g., for CLI, SI, and/or wireless sensing) and a parameter indicating a usage (e.g., for CLI, SI, and/or wireless sensing) associated with measurement resources of with the measurement object. In some aspects, the measurement configuration may indicate a first measurement object associated with CLI measurements, a second measurement object associated with SI measurements, and/or a third measurement object associated with wireless sensing measurements and a common resource pool associated with the different measurement objects. The measurement configuration may indicate a reporting configuration associated with transmitting measurement reports to the base station.

The UE may perform one or more measurements (e.g., CLI measurements, SI measurements, and/or wireless sensing measurements) based at least in part on the measurement configuration. The UE may transmit, to the base station, a measurement report indicating measurement values for one or more measurements (e.g., CLI measurements, SI measurements, and/or wireless sensing measurements). As a result, the measurement configuration may enable measurement resources and/or the measurement configuration to be shared or reused among different types of measurements (e.g., among CLI measurements, SI measurements, and/or wireless sensing measurements). This reduces a signaling overhead associated with configuring the measurements as only a single measurement configuration may be required to configure measurement resources for multiple different types of measurements. Moreover, this conserves resources as measurement resources may be reused or shared between different measurement types. Additionally, this reduces a complexity associated with configuring measurement resources for the multiple different types of measurements by sharing measurement objects and/or measurement resource pools among the multiple different types of measurements (e.g., based at least in part on the similarities of the different types of measurements, as described above).

Figure 7A:
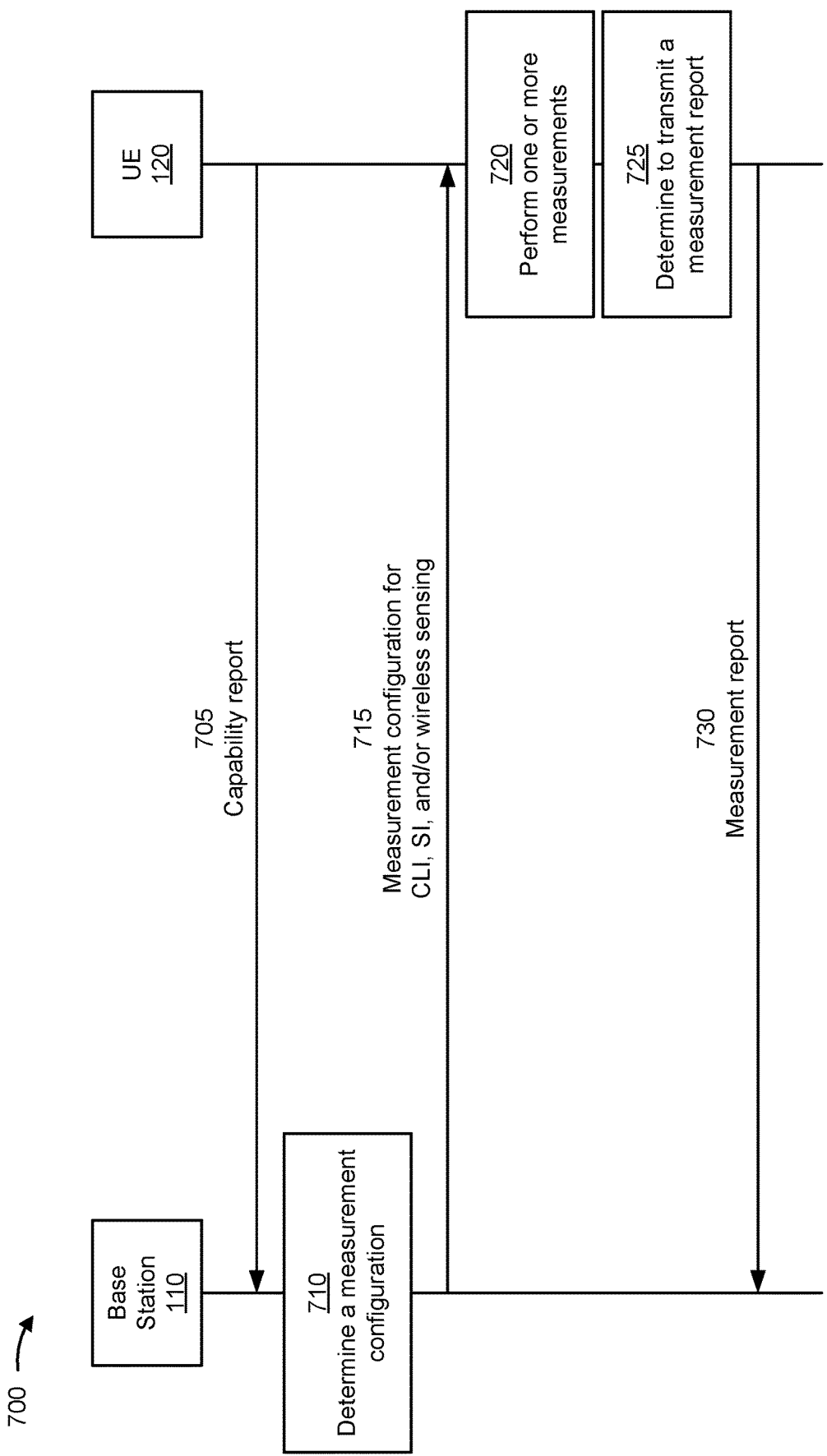
FIGS. 7A and 7B are diagrams illustrating an example associated with unified measurement configurations for CLI, SI, and wireless sensing, in accordance with the present disclosure.
Figure 7B:
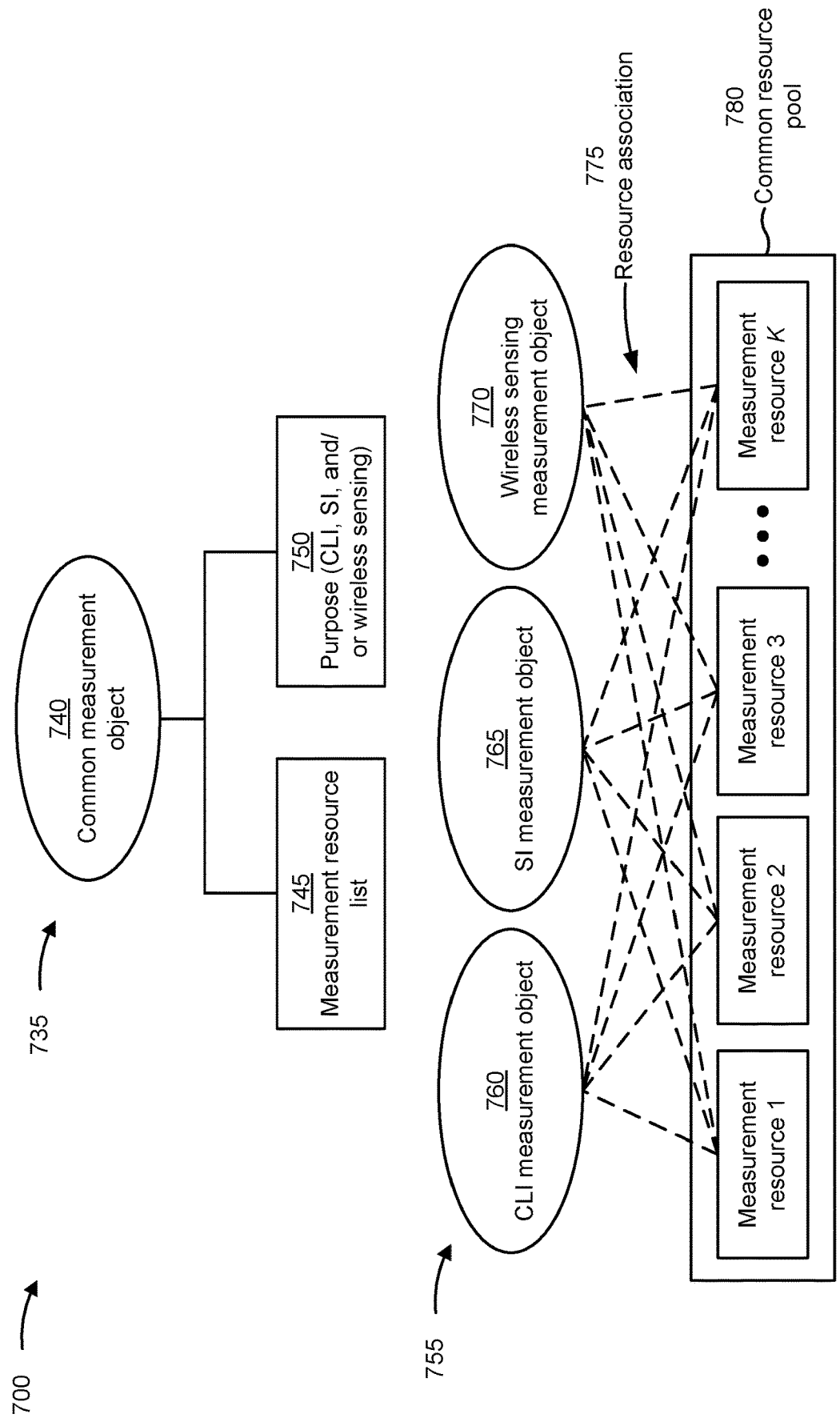

FIGS. 7A and 7B are diagrams illustrating an example 700 associated with unified measurement configurations for CLI, SI, and wireless sensing, in accordance with the present disclosure. As shown in FIG. 7A, example 700 includes communication between a base station 110 and a UE 120. In some aspects, the base station 110 and the UE 120 may be included in a wireless network, such as wireless network 100. The base station 110 and UE 120 may communicate via a wireless access link, which may include an uplink and a downlink.

As shown in FIG. 7A, the base station 110 may configure the UE 120 to perform different measurement types. For example, the base station 110 may configure the UE 120 to perform CLI measurements, SI measurements, and/or wireless sensing measurements, among other examples. In some aspects, the configuration of the different measurement types may be based at least in part on one or more capabilities of the UE 120.

For example, as shown by reference number 705, the UE 120 may transmit, and the base station 110 may receive, a capability report (e.g., a UE capability report) indicating one or more capabilities of the UE 120. In some aspects, the one or more capabilities may include an indication of whether the UE 120 supports full duplex communication (e.g., a full duplex communication capability) or half duplex communication (e.g., a half duplex communication capability). In some aspects, the full duplex communication capability may indicate that the UE 120 is capable of transmitting and receiving communications at substantially the same time and substantially the same frequency. In some aspects, the full duplex communication capability may indicate that the UE 120 is capable of transmitting and receiving communications at substantially the same time using different frequencies or different sub-bands (e.g., where the UE 120 is capable of receiving a communication using a first sub-band and transmitting a communication using a second sub-band at substantially the same time, which may be referred to as a flexible duplex communication capability). In some aspects, the one or more capabilities may include an indication of measurement types supported by the UE 120. For example, the one or more capabilities may include an indication of a CLI measurement capability, an SI measurement capability, and/or a wireless sensing measurement capability, among other examples (e.g., in an information element, such as the cli-SRS-RSRP-Meas-r16 information element for the CLI measurement capability as defined, or otherwise fixed, by the 3GPP).

In some aspects, the one or more capabilities may include an indication of whether the UE 120 supports joint measurements of different measurement types. For example, the UE 120 may be capable of performing measurements for different measurement types (e.g., CLI measurements and SI measurements) using the same measurement resource and/or group of measurement resources. In other words, the UE 120 may be capable of performing measurements for different measurement types (e.g., CLI measurements and SI measurements) at the same time or at least partially the same time (e.g., during a same measurement period or measurement window). For example, the one or more capabilities may include a joint CLI measurement and SI measurement capability indicating that the UE 120 is capable of performing CLI measurements and SI measurements using the same measurement resource(s) and/or at substantially the same time.

In some aspects, the one or more capabilities may include an indication of whether the UE 120 supports joint measurement and wireless sensing. For example, the UE 120 may be capable of performing measurements (e.g., CLI measurements and/or SI measurements) and performing wireless sensing (e.g., wireless sensing measurements) using the same measurement resource and/or group of measurement resources. In other words, the UE 120 may be capable of performing measurements and performing wireless sensing at the same time or at least partially the same time (e.g., during a same measurement period or measurement window). For example, the one or more capabilities may include a joint measurement and wireless sensing capability (e.g., a joint CLI measurement and wireless sensing capability and/or a joint SI measurement and wireless sensing capability) indicating that the UE 120 is capable of performing measurements and wireless sensing using the same measurement resource(s) and/or at substantially the same time.

In some aspects, the one or more capabilities may include an indication of whether the UE 120 supports joint measurements and communication. For example, the UE 120 may be capable of performing measurements (e.g., CLI measurements, SI measurements, and/or wireless sensing measurements) and communicating (e.g., transmitting and/or receiving) signals with another device at the same time or at overlapping times. For example, the UE 120 may be capable of supporting frequency division multiplexing of measurement resource (e.g., a reference signal) with communication signal (e.g., a downlink signal or an uplink signal). The one or more capabilities may include a joint measurement and communication capability (e.g., a joint CLI measurement and communication capability, a joint SI measurement and communication capability, and/or a joint wireless sensing and communication capability) indicating that the UE 120 is capable of performing measurements and communicating (e.g., uplink signals and/or downlink signals) with another device at substantially the same time. For example, the joint measurement and communication capability may be similar to the cli-SRS-RSRP-FDM-DL-r16 information element for joint CLI measurement and downlink communication capability as defined, or otherwise fixed, by the 3GPP.

In some aspects, the one or more capabilities may include an indication of a number of measurement resources that can be supported by the UE 120. In some aspects, the one or more capabilities may include an indication of a number of measurement resources that can be supported by the UE 120 for joint measurements. For example, in some cases, the UE 120 may be capable of supporting a smaller number of measurement resources during a period of time for joint measurements as compared to a number of measurement resources that can be supported by the UE 120 for other measurements during the period of time. The one or more capabilities may include a measurement resource capability associated with joint measurements indicating a number of measurement resources that can be supported by the UE 120 for joint measurements (e.g., for joint CLI, SI, and/or wireless sensing measurements).

As shown by reference number 710, the base station 110 may determine a measurement configuration for the UE 120 (or for a group of UEs that includes the UE 120) that is associated with CLI measurements, SI measurements, and/ or wireless sensing measurements. For example, as described above, the base station 110 may be enabled to determine a single measurement configuration for the multiple measurement types due to the similarities between CLI measurements, SI measurements, and wireless sensing measurements.

In some aspects, the base station 110 may configure a single common measurement object for CLI measurements, SI measurements, and/or wireless sensing measurements. A measurement object may indicate an object to be measured by the UE 120. For example, a measurement object may indicate a frequency and/or time location (e.g., and a subcarrier spacing) of one or more reference signals to be measured by the UE 120 (e.g., "measurement object" may be defined, or otherwise fixed, by the 3GPP). The single common measurement object may identify a parameter indicating a usage associated with measurement resources associated with (e.g., identified by) the measurement object. For example, the parameter may indicate that the usage is a CLI measurement, an SI measurement, a wireless sensing measurement, a joint SI measurement and CLI measurement, a joint CLI measurement and bistatic wireless sensing measurement, and/or a joint SI measurement and monostatic wireless sensing measurement, among other examples. In this way, the base station 110 may be enabled to configure a single measurement object for different measurement types and for joint measurements. This may conserve signaling overhead and reduce a complexity associated with configuring the different measurement types. The measurement configuration with the single common measurement object is depicted and described in more detail below in connection with FIG. 7B and reference number 735.

In some aspects, the base station 110 may configure separate measurement objects for CLI measurements, SI measurements, and/or wireless sensing measurements with the separate measurement objects being associated with a common resource pool (e.g., an SRS resource pool). For example, the base station 110 may configure a first measurement object associated with CLI measurements, a second measurement object associated with SI measurements, and/or a third measurement object associated with wireless sensing measurements, among other examples. The separate measurement objects may be associated with measurement resources (e.g., SRS resources) from the same resource pool. For example, the measurement configuration may indicate that a common resource pool is shared between at least two of the first measurement object, the second measurement object, or the third measurement object. In this way, the base station 110 may configure a same measurement resource with two measurement objects to enable joint measurements (e.g., joint CLI and SI measurements, joint CLI and wireless sensing measurements, and/or joint SI and wireless sensing measurements). For example, the measurement configuration may indicate that more than one measurement object is configured with or associated with the same measurement resource to enable joint measurements. In this way, the base station 110 may be enabled to configure a single measurement resource pool for different measurement types and/or for joint measurements. This may conserve signaling overhead and reduce a complexity associated with configuring the different measurement types. The measurement configuration with the single common resource pool is depicted and described in more detail below in connection with FIG. 7B and reference number 755.

As described above, the base station 110 may determine the measurement configuration for the UE 120 and/or for a group of UEs that includes the UE 120. For example, the base station 110 may determine the measurement configuration based at least in part on the one or more capabilities of the UE 120 (e.g., indicating in the capability report, as described above). For example, the base station 110 may configure the UE 120 to perform a type of measurement (e.g., a CLI measurement, an SI measurement, a wireless sensing measurement, and/or a joint measurement) only if the UE 120 has indicated that the UE 120 is capable of permitting that type of measurement (e.g., by indicating a measurement type capability and/or a communication capability, such as a full duplex communication capability). In some aspects, the base station 110 may determine a number of measurement resources or an association of measurement resources (e.g., to one or more measurement objects) to configure for the UE 120 based at least in part on the one or more capabilities of the UE 120.

In some aspects, the measurement configuration may indicate a reporting configuration. The reporting configuration may define the reporting criteria for the UE 120 to transmit a measurement report. For example, the reporting configuration may indicate that the reporting criteria is periodic (e.g., indicating that the UE 120 is to transmit periodic measurement reports), semi-persistent (indicating that the UE 120 is to transmit semi-persistent measurement reports), aperiodic (indicating that the UE 120 is to transmit aperiodic measurement reports, such as a measurement report in response to a downlink message or request from the base station 110), and/or trigger event based (e.g., indicating that the UE 120 is to transmit a measurement report based at least in part on detecting a trigger event), among other examples.

In some aspects, the reporting configuration may indicate that a trigger event includes a measurement value satisfying a first threshold (e.g., a measurement (e.g., an RSRP or a signal-to-noise ratio (SNR)) of interference and/or wireless sensing satisfying the first threshold). In some aspects, the reporting configuration may indicate that a trigger event includes a time of arrival variation satisfying a second threshold (e.g., a difference between a time of arrival associated with a current measurement and a time of arrival of a previous measurement satisfying the second threshold). In some aspects, the reporting configuration may indicate that a trigger event includes a measurement value variation satisfying a third threshold (e.g., a difference between a measurement value (e.g., an RSRP or an SNR) of a current measurement and a measurement value of a previous measurement satisfying the third threshold). In some aspects, the reporting configuration may indicate that a trigger event includes an object detection event associated with a wireless sensing measurement (e.g., indicating that a new target object has been detected by the UE 120 and/or that a previously reporting target object is no longer detected by the UE 120).

In some aspects, the reporting configuration may indicate a content of a measurement report (e.g., may indicate information that the UE 120 is to include in a measurement report). For example, the reporting configuration may indicate that the UE 120 is to report a measurement object index (e.g., identifying a measurement object configured by the base station 110) associated with a measurement identified in the measurement report. In some aspects, the reporting configuration may indicate that the UE 120 is to report a measurement resource index or a reference signal index (e.g., identifying a measurement resource configured by the base station 110), such as an SRS index, associated with a measurement identified in the measurement report. In some aspects, the reporting configuration may indicate that the UE 120 is to report one or more time of arrivals associated with measurements identified in the measurement report. For example, the reporting configuration may indicate that the UE 120 is to report a time of arrival of a first M arrival paths (e.g., a first M measurements) received or measured by the UE 120 during a measurement period or a measurement window, where M is a number greater than zero. In some aspects, the reporting configuration may indicate that the UE 120 is to report one or more measurement values of measurements performed by the UE 120 during a measurement period or a measurement window. For example, the reporting configuration may indicate that the UE 120 is to report measurement values (e.g., SRS RSRP values) for one or more dominant paths received or measured by the UE 120 during the measurement period or the measurement window. In some aspects, the reporting configuration may indicate that the UE 120 is to report the one or more highest measurement values (e.g., SRS RSRP values) measured by the UE 120 during the measurement period or the measurement window.

As shown by reference number 715, the base station 110 may transmit, and the UE 120 may receive, the measurement configuration (e.g., determined and/or configured by the base station 110 as described above) associated with CLI measurements, SI measurements, and/or wireless sensing measurements. For example, the base station 110 may transmit the measurement configuration indicating a single common measurement object for CLI measurements, SI measurements, and/or wireless sensing measurements. In some aspects, the base station 110 may transmit the measurement configuration indicating separate measurement objects for CLI measurements, SI measurements, and/or wireless sensing measurements with a common resource pool for the separate measurement objects. The base station 110 may transmit the measurement configuration indicating the reporting configuration, as described above.

The UE 120 may receive, from the base station 110, the measurement configuration. The UE 120 may identify one or more measurement objects and/or one or more measurement resources for performing CLI measurements, SI measurements, and/or wireless sensing measurements. As shown by reference number 720, the UE 120 may perform one or more measurements based at least in part on receiving the measurement configuration. For example, the UE 120 may perform a CLI measurement, an SI measurement, a wireless sensing measurement, a joint CLI and SI measurement, a joint CLI and wireless sensing measurement, and/or a joint SI and wireless sensing measurement, among other examples. The UE 120 may measure one or more measurement resources (e.g., one or more SRS resources) based at least in part on the measurement configuration and/or a resource association indicated by the measurement configuration.

As shown by reference number 725, the UE 120 may determine to transmit a measurement report based at least in part on the measurement configuration. For example, the UE 120 may determine to transmit a measurement report based at least in part on the reporting configuration associated with the measurement configuration. In some aspects, the UE 120 may determine to transmit the measurement report according to a periodic schedule (e.g., a periodic measurement report). In some aspects, the UE 120 may determine to transmit the measurement report according to a semi-persistent schedule (e.g., a semi-persistent measurement report). In some aspects, the UE 120 may determine to transmit the measurement report based at least in part on receiving a message or request from the base station 110 (e.g., an aperiodic measurement report). In some aspects, the UE 120 may determine to transmit the measurement report based at least in part on detecting a trigger event (e.g., a trigger event based measurement report). For example, the UE 120 may detect one or more of the trigger events indicated by the reporting configuration, as described above.

As shown by reference number 730, the UE 120 may transmit, and the base station 110 may receive, a measurement report. For example, the UE 120 may transmit the measurement report based at least in part on determining to transmit the measurement report, as described above. In some aspects, the UE 120 may include information in the measurement as indicated by the measurement configuration. For example, the measurement report may indicate a measurement object index associated with a measurement identified in the measurement report, a measurement resource index or a reference signal index associated with a measurement identified in the measurement report, one or more time of arrivals associated with measurement(s) identified in the measurement report, one or more measurement values of measurements performed by the UE 120 during a measurement period or a measurement window, and/or other parameters (e.g., Doppler spread and/or AoA) associated with measurements performed by the UE 120 (e.g., for wireless sensing measurements), among other examples.

FIG. 7B depicts different measurement configurations for unified and/or coordinated CLI measurements, SI measurements, and/or wireless sensing measurements. For example, as shown by reference number 735, and as described above, the measurement configuration may indicate a single common measurement object 740 for CLI measurements, SI measurements, and/or wireless sensing measurements. The common measurement object 740 may be associated with a measurement resource list 745 indicating one or more measurement resources, such as SRS resources, to be used for measurements associated with the common measurement object 740. The common measurement object 740 may be associated with a parameter 750 (e.g., a parameter field) indicating a usage associated with the common measurement object 740. For example, the parameter may indicate that the usage is a CLI measurement, an SI measurement, a wireless sensing measurement, a joint SI measurement and CLI measurement, a joint CLI measurement and bistatic wireless sensing measurement, and/or a joint SI measurement and monostatic wireless sensing measurement, among other examples. This may conserve resources (e.g., as separate measurement objects and separate measurement resources are not required to be configured for CLI measurements, SI measurements, and/or wireless sensing measurements) and reduce a complexity associated with measurement configurations for CLI measurements, SI measurements, and/or wireless sensing measurements.

As shown by reference number 755, the measurement configuration may indicate separate measurement objects associated with a common resource pool for CLI measurements, SI measurements, and/or wireless sensing measurements. For example, the measurement configuration may indicate a CLI measurement object 760, an SI measurement object 765, and/or a wireless sensing measurement object 770. The measurement objects may indicate a type of measurement associated with the measurement object (e.g., the CLI measurement object 760 may be associated with CLI measurements). As shown by reference number 775, the measurement configuration may indicate a resource associated between a measurement object and one or more measurement resources included in a common resource pool 780. For example, the common resource pool 780 may include one or more measurement resources (e.g., one or more SRS resources), such a K measurement resources as shown in FIG. 7B.

The measurement configuration may indicate an association between a measurement object and one or more measurement resources (e.g., indicating that the UE 120 is to use the associated measurement resource for the type of measurement associated with the measurement object). For example, the CLI measurement object 760 may be associated with a first measurement resource (e.g., measurement resource 1) indicating that the UE 120 is to use the first measurement resource to perform a CLI measurement. In some aspects, a single measurement resource may be associated with multiple measurement objects. For example, the measurement configuration may indicate that the first measurement resource is associated with the CLI measurement object 760 and the SI measurement object 765 indicating that the UE 120 is to use the first measurement resource to perform a joint CLI and SI measurement. In this way, the base station 110 may configure a unified measurement configuration for CLI measurements, SI measurements, and/or wireless sensing measurements. Additionally, configuring a single common resource pool (e.g., the common resource pool 780) may conserve resources (e.g., as each measurement object does not require an independent resource pool) and reduce complexity associated with measurement configurations for CLI measurements, SI measurements, and/or wireless sensing measurements.

As a result, the measurement configuration may enable measurement resources and/or the measurement configuration to be shared or reused among different types of measurements (e.g., among CLI measurements, SI measurements, and/or wireless sensing measurements). This reduces a signaling overhead associated with configuring the measurements as only a single measurement configuration may be required to configure measurement resources for multiple different types of measurements. Moreover, this conserves resources as measurement resources may be reused or shared between different measurement types. Additionally, this reduces a complexity associated with configuring measurement resources for the multiple different types of measurements by sharing measurement objects and/or measurement resource pools among the multiple different types of measurements (e.g., based at least in part on the similarities of the different types of measurements, as described above).

As indicated above, FIGS. 7A and 7B are provided as examples. Other examples may differ from what is described with respect to FIGS. 7A and 7B.

FIG. 8 is a diagram illustrating an example process 800 performed, for example, by a UE, in accordance with the present disclosure. Example process 800 is an example where the UE (e.g., UE 120) performs operations associated with unified measurement configurations for CLI, SI, and wireless sensing.

As shown in FIG. 8, in some aspects, process 800 may include receiving a measurement configuration that is associated with a common measurement object or a common resource pool for at least two of CLI measurements, SI measurements, or wireless sensing measurements (block 810). For example, the UE (e.g., using reception component 1002, depicted in FIG. 10) may receive a measurement configuration that is associated with a common measurement object or a common resource pool for at least two of CLI measurements, SI measurements, or wireless sensing measurements, as described above.

As further shown in FIG. 8, in some aspects, process 800 may include performing, based at least in part on the measurement configuration, one or more measurements that include at least one of a CLI measurement, an SI measurement, or a wireless sensing measurement (block 820). For example, the UE (e.g., using measurement component 1008, depicted in FIG. 10) may perform, based at least in part on the measurement configuration, one or more measurements that include at least one of a CLI measurement, an SI measurement, or a wireless sensing measurement, as described above.

As further shown in FIG. 8, in some aspects, process 800 may include transmitting, based at least in part on the measurement configuration, a measurement report indicating at least one measurement of the one or more measurements (block 830). For example, the UE (e.g., using transmission component 1004, depicted in FIG. 10) may transmit, based at least in part on the measurement configuration, a measurement report indicating at least one measurement of the one or more measurements, as described above.

Process 800 may include additional aspects, such as any single aspect or any combination of aspects described below and/or in connection with one or more other processes described elsewhere herein.

In a first aspect, receiving the measurement configuration includes receiving the measurement configuration indicating a measurement object and a parameter indicating a usage associated with measurement resources associated with the measurement object.

In a second aspect, alone or in combination with the first aspect, the parameter indicates that the usage is at least one of a CLI measurement, an SI measurement, a wireless sensing measurement, a joint SI measurement and CLI measurement, a joint CLI measurement and bistatic wireless sensing measurement, or a joint SI measurement and monostatic wireless sensing measurement.

In a third aspect, alone or in combination with one or more of the first and second aspects, receiving the measurement configuration includes receiving the measurement configuration indicating at least one of a first measurement object associated with CLI measurements, a second measurement object associated with SI measurements, or a third measurement object associated with wireless sensing measurements.

In a fourth aspect, alone or in combination with one or more of the first through third aspects, receiving the measurement configuration includes receiving the measurement configuration indicating that the common resource pool is shared between at least two of the first measurement object, the second measurement object, or the third measurement object.

In a fifth aspect, alone or in combination with one or more of the first through fourth aspects, process 800 includes transmitting a capability report indicating one or more capabilities associated with the UE, wherein the measurement configuration is based at least in part on the one or more capabilities.

In a sixth aspect, alone or in combination with one or more of the first through fifth aspects, the one or more capabilities include at least one of a full-duplex communication capability, a CLI measurement capability, an SI measurement capability, a wireless sensing measurement capability, a joint CLI measurement and SI measurement capability, a joint measurement and wireless sensing capability, a joint measurement and communication capability, or a measurement resource capability associated with joint measurements.

In a seventh aspect, alone or in combination with one or more of the first through sixth aspects, transmitting the measurement report includes transmitting the measurement report indicating at least one of: a measurement object index associated with the at least one measurement, a reference signal index associated with the at least one measurement, a time of arrival associated with the at least one measurement, or a measurement value associated with the at least one measurement.

In an eighth aspect, alone or in combination with one or more of the first through seventh aspects, transmitting the measurement report includes transmitting the measurement report based at least in part on a reporting configuration associated with the measurement configuration, wherein the reporting configuration indicates that the measurement report is at least one of: a periodic measurement report, a semi-persistent measurement report, an aperiodic measurement report, or a trigger event based measurement report.

In a ninth aspect, alone or in combination with one or more of the first through eighth aspects, receiving the measurement configuration includes receiving a reporting configuration that indicates one or more trigger events associated with reporting measurements, wherein the one or more trigger events include at least one of: a measurement value satisfying a first threshold, a time of arrival variation satisfying a second threshold, a measurement value variation satisfying a third threshold, or an object detection event associated with a wireless sensing measurement.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
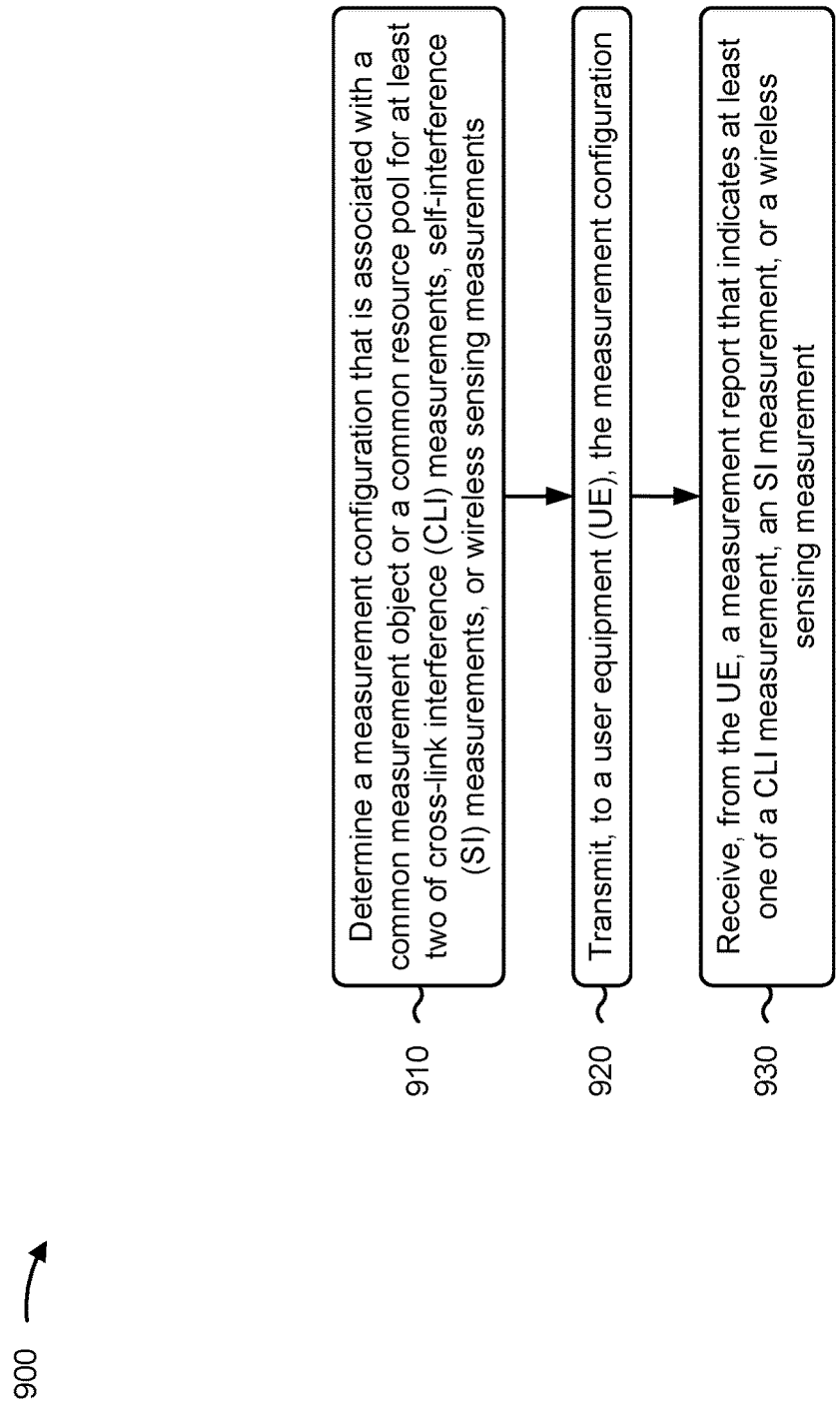

FIG. 9 is a diagram illustrating an example process 900 performed, for example, by a base station, in accordance with the present disclosure. Example process 900 is an example where the base station (e.g., base station 110) performs operations associated with unified measurement configurations for CLI, SI, and wireless sensing.

As shown in FIG. 9, in some aspects, process 900 may include determining a measurement configuration that is associated with a common measurement object or a common resource pool for at least two of CLI measurements, SI measurements, or wireless sensing measurements (block 910). For example, the base station (e.g., using determination component 1108, depicted in FIG. 11) may determine a measurement configuration that is associated with a common measurement object or a common resource pool for at least two of CLI measurements, SI measurements, or wireless sensing measurements, as described above.

As further shown in FIG. 9, in some aspects, process 900 may include transmitting, to a UE, the measurement configuration (block 920). For example, the base station (e.g., using transmission component 1104, depicted in FIG. 11) may transmit, to a UE, the measurement configuration, as described above.

As further shown in FIG. 9, in some aspects, process 900 may include receiving, from the UE, a measurement report that indicates at least one of a CLI measurement, an SI measurement, or a wireless sensing measurement (block 930). For example, the base station (e.g., using reception component 1102, depicted in FIG. 11) may receive, from the UE, a measurement report that indicates at least one of a CLI measurement, an SI measurement, or a wireless sensing measurement, as described above.

Process 900 may include additional aspects, such as any single aspect or any combination of aspects described below and/or in connection with one or more other processes described elsewhere herein.

In a first aspect, transmitting the measurement configuration includes transmitting the measurement configuration indicating a measurement object and a parameter indicating a usage associated with measurement resources associated with the measurement object.

In a second aspect, alone or in combination with the first aspect, the parameter indicates that the usage is at least one of a CLI measurement, an SI measurement, a wireless sensing measurement, a joint SI measurement and CLI measurement, a joint CLI measurement and bistatic wireless sensing measurement, or a joint SI measurement and monostatic wireless sensing measurement.

In a third aspect, alone or in combination with one or more of the first and second aspects, transmitting the measurement configuration includes transmitting the measurement configuration indicating at least one of a first measurement object associated with CLI measurements, a second measurement object associated with SI measurements, or a third measurement object associated with wireless sensing measurements.

In a fourth aspect, alone or in combination with one or more of the first through third aspects, transmitting the measurement configuration includes transmitting the measurement configuration indicating that the common resource pool is shared between at least two of the first measurement object, the second measurement object, or the third measurement object.

In a fifth aspect, alone or in combination with one or more of the first through fourth aspects, process 900 includes receiving, from the UE, a capability report indicating one or more capabilities associated with the UE, wherein determining the measurement configuration is based at least in part on the one or more capabilities.

In a sixth aspect, alone or in combination with one or more of the first through fifth aspects, the one or more capabilities include at least one of a full-duplex communication capability, a CLI measurement capability, an SI measurement capability, a wireless sensing measurement capability, a joint CLI measurement and SI measurement capability, a joint measurement and wireless sensing capability, a joint measurement and communication capability, or a measurement resource capability associated with joint measurements.

In a seventh aspect, alone or in combination with one or more of the first through sixth aspects, receiving the measurement report includes receiving the measurement report indicating at least one of: a measurement object index, a reference signal index, a time of arrival associated with one or more measurements, or a measurement value associated with the one or more measurements.

In an eighth aspect, alone or in combination with one or more of the first through seventh aspects, receiving the measurement report includes receiving the measurement report based at least in part on a reporting configuration associated with the measurement configuration, wherein the reporting configuration indicates that the measurement report is at least one of: a periodic measurement report, a semi-persistent measurement report, an aperiodic measurement report, or a trigger event based measurement report.

In a ninth aspect, alone or in combination with one or more of the first through eighth aspects, transmitting the measurement configuration includes transmitting a reporting configuration that indicates one or more trigger events associated with reporting measurements, wherein the one or more trigger events include at least one of: a measurement value satisfying a first threshold, a time of arrival variation satisfying a second threshold, a measurement value variation satisfying a third threshold, or an object detection event associated with a wireless sensing measurement.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
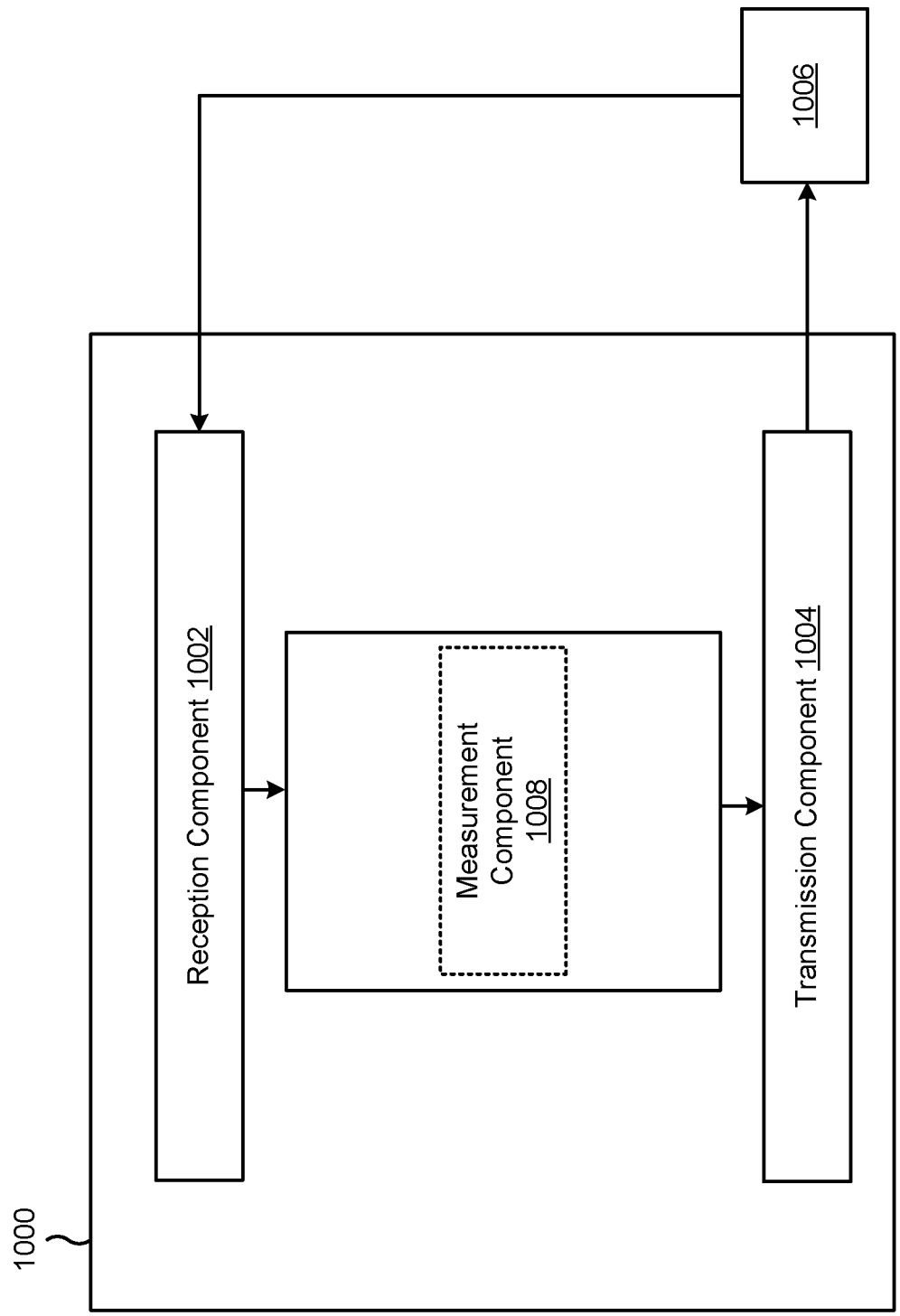
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a measurement component 1008, among other examples.

In some aspects, the apparatus 1000 may be configured to perform one or more operations described herein in connection with FIGS. 7A and 7B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive a measurement configuration that is associated with a common measurement object or a common resource pool for at least two of CLI measurements, SI measurements, or wireless sensing measurements. The measurement component 1008 may perform, based at least in part on the measurement configuration, one or more measurements that include at least one of a CLI measurement, an SI measurement, or a wireless sensing measurement. The transmission component 1004 may transmit, based at least in part on the measurement configuration, a measurement report indicating at least one measurement of the one or more measurements.

The transmission component 1004 may transmit a capability report indicating one or more capabilities associated with the UE, wherein the measurement configuration is based at least in part on the one or more capabilities.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
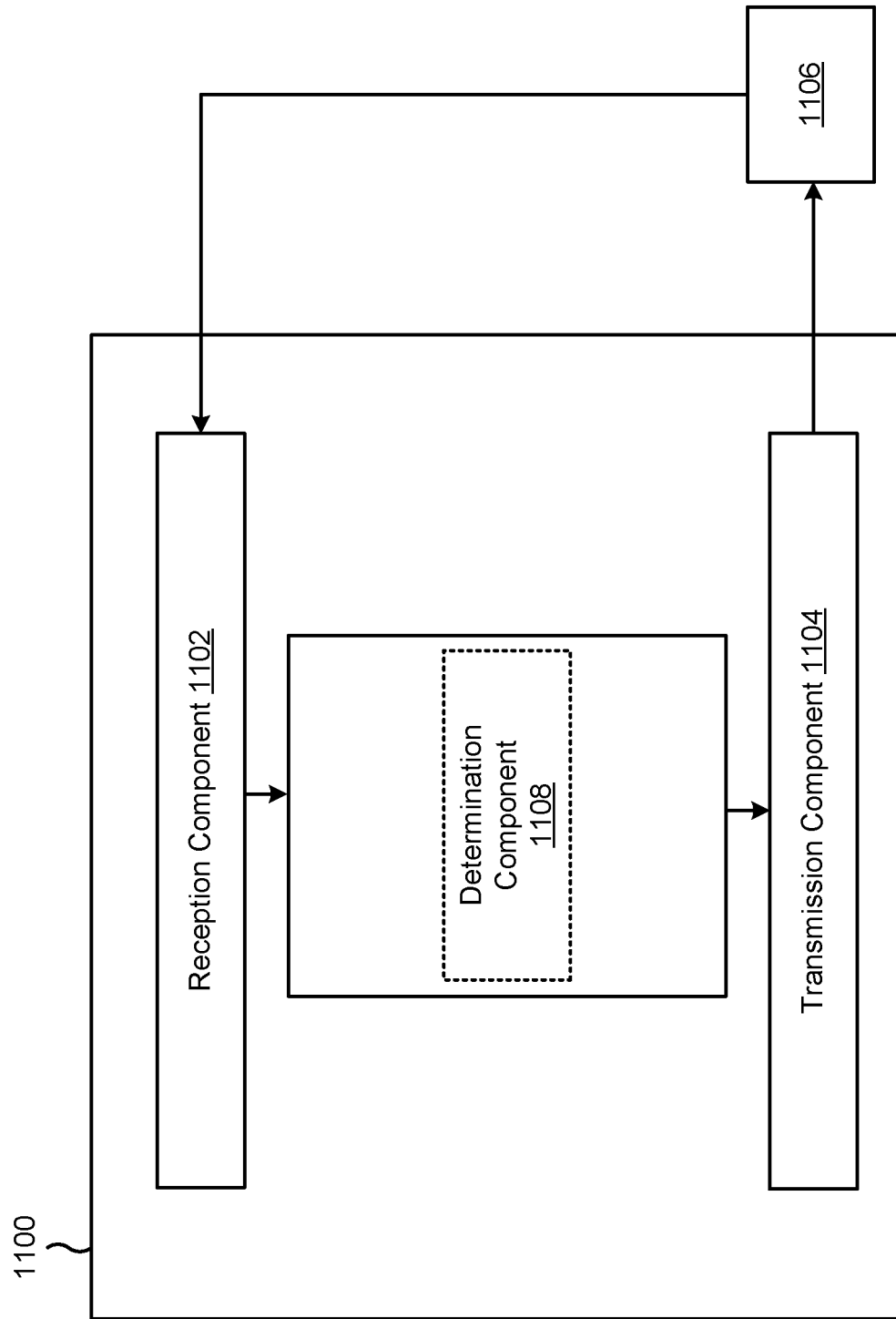

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 7A and 7B. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The determination component 1108 may determine a measurement configuration that is associated with a common measurement object or a common resource pool for at least two of CLI measurements, SI measurements, or wireless sensing measurements. The transmission component 1104 may transmit, to a UE, the measurement configuration. The reception component 1102 may receive, from the UE, a measurement report that indicates at least one of a CLI measurement, an SI measurement, or a wireless sensing measurement.

The reception component 1102 may receive, from the UE, a capability report indicating one or more capabilities associated with the UE, wherein determining the measurement configuration is based at least in part on the one or more capabilities.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a measurement configuration that is associated with a common measurement object or a common resource pool for at least two of cross-link interference (CLI) measurements, self-interference (SI) measurements, or wireless sensing measurements; performing, based at least in part on the measurement configuration, one or more measurements that include at least one of a CLI measurement, an SI measurement, or a wireless sensing measurement; and transmitting, based at least in part on the measurement configuration, a measurement report indicating at least one measurement of the one or more measurements.

Aspect 2: The method of Aspect 1, wherein receiving the measurement configuration comprises: receiving the measurement configuration indicating a measurement object and a parameter indicating a usage associated with measurement resources associated with the measurement object.

Aspect 3: The method of Aspect 2, wherein the parameter indicates that the usage is at least one of: a CLI measurement, an SI measurement, a wireless sensing measurement, a joint SI measurement and CLI measurement, a joint CLI measurement and bistatic wireless sensing measurement, or a joint SI measurement and monostatic wireless sensing measurement.

Aspect 4: The method of Aspect 1, wherein receiving the measurement configuration comprises: receiving the measurement configuration indicating at least one of a first measurement object associated with CLI measurements, a second measurement object associated with SI measurements, or a third measurement object associated with wireless sensing measurements.

Aspect 5: The method of Aspect 4, wherein receiving the measurement configuration comprises: receiving the measurement configuration indicating that the common resource pool is shared between at least two of the first measurement object, the second measurement object, or the third measurement object.

Aspect 6: The method of any of Aspects 1-5, further comprising: transmitting a capability report indicating one or more capabilities associated with the UE, wherein the measurement configuration is based at least in part on the one or more capabilities.

Aspect 7: The method of Aspect 6, wherein the one or more capabilities include at least one of: a full-duplex communication capability, a CLI measurement capability, an SI measurement capability, a wireless sensing measurement capability, a joint CLI measurement and SI measurement capability, a joint measurement and wireless sensing capability, a joint measurement and communication capability, or a measurement resource capability associated with joint measurements.

Aspect 8: The method of any of Aspects 1-7, wherein transmitting the measurement report comprises: transmitting the measurement report indicating at least one of: a measurement object index associated with the at least one measurement, a reference signal index associated with the at least one measurement, a time of arrival associated with the at least one measurement, or a measurement value associated with the at least one measurement.

Aspect 9: The method of any of Aspects 1-8, wherein transmitting the measurement report comprises: transmitting the measurement report based at least in part on a reporting configuration associated with the measurement configuration, wherein the reporting configuration indicates that the measurement report is at least one of: a periodic measurement report, a semi-persistent measurement report, an aperiodic measurement report, or a trigger event based measurement report.

Aspect 10: The method of any of Aspects 1-9, wherein receiving the measurement configuration comprises: receiving a reporting configuration that indicates one or more trigger events associated with reporting measurements, wherein the one or more trigger events include at least one of: a measurement value satisfying a first threshold, a time of arrival variation satisfying a second threshold, a measurement value variation satisfying a third threshold, or an object detection event associated with a wireless sensing measurement.

Aspect 11: A method of wireless communication performed by a base station, comprising: determining a measurement configuration that is associated with a common measurement object or a common resource pool for at least two of cross-link interference (CLI) measurements, self-interference (SI) measurements, or wireless sensing measurements; transmitting, to a user equipment (UE), the measurement configuration; and receiving, from the UE, a measurement report that indicates at least one of a CLI measurement, an SI measurement, or a wireless sensing measurement.

Aspect 12: The method of Aspect 11, wherein transmitting the measurement configuration comprises: transmitting the measurement configuration indicating a measurement object and a parameter indicating a usage associated with measurement resources associated with the measurement object.

Aspect 13: The method of Aspect 12, wherein the parameter indicates that the usage is at least one of: a CLI measurement, an SI measurement, a wireless sensing measurement, a joint SI measurement and CLI measurement, a joint CLI measurement and bistatic wireless sensing measurement, or a joint SI measurement and monostatic wireless sensing measurement.

Aspect 14: The method of Aspect 11, wherein transmitting the measurement configuration comprises: transmitting the measurement configuration indicating at least one of a first measurement object associated with CLI measurements, a second measurement object associated with SI measurements, or a third measurement object associated with wireless sensing measurements.

Aspect 15: The method of Aspect 14, wherein transmitting the measurement configuration comprises: transmitting the measurement configuration indicating that the common resource pool is shared between at least two of the first measurement object, the second measurement object, or the third measurement object.

Aspect 16: The method of any of Aspects 11-15, further comprising: receiving, from the UE, a capability report indicating one or more capabilities associated with the UE, wherein determining the measurement configuration is based at least in part on the one or more capabilities.

Aspect 17: The method of Aspect 16, wherein the one or more capabilities include at least one of: a full-duplex communication capability, a CLI measurement capability, an SI measurement capability, a wireless sensing measurement capability, a joint CLI measurement and SI measurement capability, a joint measurement and wireless sensing capability, a joint measurement and communication capability, or a measurement resource capability associated with joint measurements.

Aspect 18: The method of any of Aspects 11-17, wherein receiving the measurement report comprises: receiving the measurement report indicating at least one of: a measurement object index, a reference signal index, a time of arrival associated with one or more measurements, or a measurement value associated with the one or more measurements.

Aspect 19: The method of any of Aspects 11-18, wherein receiving the measurement report comprises: receiving the measurement report based at least in part on a reporting configuration associated with the measurement configuration, wherein the reporting configuration indicates that the measurement report is at least one of: a periodic measurement report, a semi-persistent measurement report, an aperiodic measurement report, or a trigger event based measurement report.

Aspect 20: The method of any of Aspects 11-19, wherein transmitting the measurement configuration comprises: transmitting a reporting configuration that indicates one or more trigger events associated with reporting measurements, wherein the one or more trigger events include at least one of: a measurement value satisfying a first threshold, a time of arrival variation satisfying a second threshold, a measurement value variation satisfying a third threshold, or an object detection event associated with a wireless sensing measurement.

Aspect 21: An apparatus for wireless communication at a device, comprising a processor; memory coupled with the processor; and instructions stored in the memory and executable by the processor to cause the apparatus to perform the method of one or more Aspects of Aspects 1-10.

Aspect 22: A device for wireless communication, comprising a memory and one or more processors coupled to the memory, the memory and the one or more processors configured to perform the method of one or more Aspects of Aspects 1-10.

Aspect 23: An apparatus for wireless communication, comprising at least one means for performing the method of one or more Aspects of Aspects 1-10.

Aspect 24: A non-transitory computer-readable medium storing code for wireless communication, the code comprising instructions executable by a processor to perform the method of one or more Aspects of Aspects 1-10.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-10.

Aspect 26: An apparatus for wireless communication at a device, comprising a processor; memory coupled with the processor; and instructions stored in the memory and executable by the processor to cause the apparatus to perform the method of one or more Aspects of Aspects 11-20.

Aspect 27: A device for wireless communication, comprising a memory and one or more processors coupled to the memory, the memory and the one or more processors configured to perform the method of one or more Aspects of Aspects 11-20.

Aspect 28: An apparatus for wireless communication, comprising at least one means for performing the method of one or more Aspects of Aspects 11-20.

Aspect 29: A non-transitory computer-readable medium storing code for wireless communication, the code comprising instructions executable by a processor to perform the method of one or more Aspects of Aspects 11-20.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 11-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive a measurement configuration that is associated with a common measurement object or a common resource pool for wireless sensing measurements and at least one of cross-link interference (CLI) measurements, or self-interference (SI) measurements, wherein the measurement configuration indicates a usage associated with measurement resources to be used to perform multiple different measurement types including the wireless sensing measurements, and wherein the measurement configuration indicates a measurement object associated with the wireless sensing measurements;
perform, based at least in part on the measurement configuration, one or more measurements that include at least one of a CLI measurement, an SI measurement, or a wireless sensing measurement; and
transmit, based at least in part on the measurement configuration, a measurement report indicating at least one measurement of the one or more measurements.

2. The UE of claim 1, wherein the measurement configuration further indicates a parameter indicating the usage associated with the measurement resources identified by the measurement object.

3. The UE of claim 1, wherein the measurement object associated with the wireless sensing measurements comprises a first measurement object, and
wherein the measurement configuration further indicates at least one of a second measurement object associated with the CLI measurements, or a third measurement object associated with the SI measurements.

4. The UE of claim 3, wherein the one or more processors, to receive the measurement configuration, are configured to:
receive the measurement configuration indicating that the common resource pool is shared between at least two of the first measurement object, the second measurement object, or the third measurement object.

5. The UE of claim 1, wherein the one or more processors are further configured to:
transmit a capability report indicating one or more capabilities associated with the UE, wherein the measurement configuration is based at least in part on the one or more capabilities.

6. The UE of claim 1, wherein the one or more processors, to transmit the measurement report, are configured to:
transmit the measurement report indicating at least one of:
a measurement object index associated with the at least one measurement,
a reference signal index associated with the at least one measurement,
a time of arrival associated with the at least one measurement, or
a measurement value associated with the at least one measurement.

7. The UE of claim 1, wherein the one or more processors, to transmit the measurement report, are configured to:
transmit the measurement report based at least in part on a reporting configuration associated with the measurement configuration, wherein the reporting configuration indicates that the measurement report is at least one of:
a periodic measurement report,
a semi-persistent measurement report,
an aperiodic measurement report, or
a trigger event based measurement report.

8. The UE of claim 1, wherein the one or more processors, to receive the measurement configuration, are configured to:
receive a reporting configuration that indicates one or more trigger events associated with reporting measurements, wherein the one or more trigger events include at least one of:
a measurement value satisfying a first threshold,
a time of arrival variation satisfying a second threshold,
a measurement value variation satisfying a third threshold, or
an object detection event associated with a wireless sensing measurement.

9. A network entity for wireless communication, comprising:
a memory; and
one or more processors, coupled to the memory, configured to:
determine a measurement configuration that is associated with a common measurement object or a common resource pool for wireless sensing measurements and at least one of cross-link interference (CLI) measurements, or self-interference (SI) measurements, wherein the measurement configuration indicates a usage associated with measurement resources to be used to perform multiple different measurement types including the wireless sensing measurements, and wherein the measurement configuration indicates a measurement object associated with the wireless sensing measurements;
transmit, to a user equipment (UE), the measurement configuration; and receive, from the UE, a measurement report that indicates at least one of a CLI measurement, an SI measurement, or a wireless sensing measurement.

10. The network entity of claim 9, wherein the measurement configuration further indicates a parameter indicating the usage associated with the measurement resources identified by the measurement object.

11. The network entity of claim 9, wherein the measurement object associated with the wireless sensing measurements comprises a first measurement object, and
wherein the measurement configuration further indicates at least one of a second measurement object associated with the CLI measurements, or a third measurement object associated with the SI measurements.

12. The network entity of claim 11, wherein the one or more processors, to transmit the measurement configuration, are configured to:
transmit the measurement configuration indicating that the common resource pool is shared between at least two of the first measurement object, the second measurement object, or the third measurement object.

13. The network entity of claim 9, wherein the one or more processors are further configured to:
receive, from the UE, a capability report indicating one or more capabilities associated with the UE, wherein determining the measurement configuration is based at least in part on the one or more capabilities.

14. The network entity of claim 9, wherein the one or more processors, to receive the measurement report, are configured to:
receive the measurement report indicating at least one of:
a measurement object index,
a reference signal index,
a time of arrival associated with one or more measurements included within the measurement report, or
a measurement value associated with the one or more measurements.

15. The network entity of claim 9, wherein the one or more processors, to transmit the measurement configuration, are configured to:
transmit a reporting configuration that indicates one or more trigger events associated with reporting measurements, wherein the one or more trigger events include at least one of:
a measurement value satisfying a first threshold,
a time of arrival variation satisfying a second threshold,
a measurement value variation satisfying a third threshold, or
an object detection event associated with a wireless sensing measurement.

16. A method of wireless communication performed by a user equipment (UE), comprising:
receiving a measurement configuration that is associated with a common measurement object or a common resource pool for wireless sensing measurements and at least one of cross-link interference (CLI) measurements, or self-interference (SI) measurements, wherein the measurement configuration indicates a usage associated with measurement resources to be used to perform multiple different measurement types including the wireless sensing measurements, and wherein the measurement configuration indicates a measurement object associated with the wireless sensing measurements;
performing, based at least in part on the measurement configuration, one or more measurements that include at least one of a CLI measurement, an SI measurement, or a wireless sensing measurement; and
transmitting, based at least in part on the measurement configuration, a measurement report indicating at least one measurement of the one or more measurements.

17. The method of claim 16, wherein the measurement configuration further indicates a parameter indicating the usage associated with the measurement resources identified by the measurement object.

18. The method of claim 16, wherein the measurement object associated with the wireless sensing measurements comprises a first measurement object, and
wherein the measurement configuration further indicates at least one of a second measurement object associated with CLI measurements, or a third measurement object associated with SI measurements.

19. The method of claim 18, wherein receiving the measurement configuration comprises:
receiving the measurement configuration indicating that the common resource pool is shared between at least two of the first measurement object, the second measurement object, or the third measurement object.

20. The method of claim 16, further comprising:
transmitting a capability report indicating one or more capabilities associated with the UE, wherein the measurement configuration is based at least in part on the one or more capabilities.

21. The method of claim 16, wherein transmitting the measurement report comprises:
transmitting the measurement report indicating at least one of:
a measurement object index associated with the at least one measurement,
a reference signal index associated with the at least one measurement,
a time of arrival associated with the at least one measurement, or
a measurement value associated with the at least one measurement.

22. The method of claim 16, wherein transmitting the measurement report comprises:
transmitting the measurement report based at least in part on a reporting configuration associated with the measurement configuration, wherein the reporting configuration indicates that the measurement report is at least one of:
a periodic measurement report,
a semi-persistent measurement report,
an aperiodic measurement report, or
a trigger event based measurement report.

23. The method of claim 16, wherein receiving the measurement configuration comprises:
receiving a reporting configuration that indicates one or more trigger events associated with reporting measurements, wherein the one or more trigger events include at least one of:
a measurement value satisfying a first threshold,
a time of arrival variation satisfying a second threshold,
a measurement value variation satisfying a third threshold, or
an object detection event associated with a wireless sensing measurement.

24. A method of wireless communication performed by a network entity, comprising:
determining a measurement configuration that is associated with a common measurement object or a common resource pool for wireless sensing measurements and at least one of cross-link interference (CLI) measurements, or self-interference (SI) measurements, wherein the measurement configuration indicates a usage associated with measurement resources to be used to perform multiple different measurement types including the wireless sensing measurements, and wherein the measurement configuration indicates a measurement object associated with the wireless sensing measurements;

transmitting, to a user equipment (UE), the measurement configuration; and receiving, from the UE, a measurement report that indicates at least one of a CLI measurement, an SI measurement, or a wireless sensing measurement.

25. The method of claim 24, wherein the measurement configuration further indicates a parameter indicating the usage associated with the measurement resources identified by the measurement object.

26. The method of claim 24, wherein the measurement object associated with the wireless sensing measurements comprises a first measurement object, and
wherein the measurement configuration further indicates at least one of a second measurement object associated with the CLI measurements, or a third measurement object associated with the SI measurements.

27. The method of claim 26, wherein transmitting the measurement configuration comprises:
transmitting the measurement configuration indicating that the common resource pool is shared between at least two of the first measurement object, the second measurement object, or the third measurement object.

28. The method of claim 24, further comprising:
receiving, from the UE, a capability report indicating one or more capabilities associated with the UE, wherein determining the measurement configuration is based at least in part on the one or more capabilities.

29. The method of claim 24, wherein receiving the measurement report comprises:
receiving the measurement report indicating at least one of:
a measurement object index,
a reference signal index,
a time of arrival associated with one or more measurements included within the measurement report, or
a measurement value associated with the one or more measurements.

30. The method of claim 24, wherein transmitting the measurement configuration comprises:
transmitting a reporting configuration that indicates one or more trigger events associated with reporting measurements, wherein the one or more trigger events include at least one of:
a measurement value satisfying a first threshold,
a time of arrival variation satisfying a second threshold,
a measurement value variation satisfying a third threshold, or
an object detection event associated with a wireless sensing measurement.

* * * * *